United States Patent
Kwon et al.

(10) Patent No.: US 11,194,433 B2
(45) Date of Patent: *Dec. 7, 2021

(54) TOUCH SENSOR

(71) Applicant: DONGWOO FINE-CHEM CO., LTD., Iksan-si (KR)

(72) Inventors: Do Hyoung Kwon, Osan-si (KR); Sung Jin Noh, Hwaseong-si (KR); Sang Jin Park, Pyeongtaek-si (KR); Han Tae Ryu, Osan-si (KR); Jun Gu Lee, Suwon-si (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,366

(22) Filed: Jul. 26, 2019

(65) Prior Publication Data

US 2020/0042141 A1 Feb. 6, 2020

(30) Foreign Application Priority Data

Aug. 2, 2018 (KR) .................. 10-2018-0090160

(51) Int. Cl.
*G06F 3/044* (2006.01)

(52) U.S. Cl.
CPC .......... *G06F 3/0446* (2019.05); *G06F 3/0448* (2019.05); *G06F 2203/04111* (2013.01)

(58) Field of Classification Search
None
See application file for complete search history.

(56) References Cited

U.S. PATENT DOCUMENTS

| 10,725,569 | B2 * | 7/2020 | Kwon | G06F 3/041 |
| 2014/0098057 | A1 * | 4/2014 | Lee | G06F 3/0443 |
| | | | | 345/174 |

(Continued)

FOREIGN PATENT DOCUMENTS

| KR | 2014-0051649 A | 5/2014 |
| KR | 2016-0116495 A | 10/2016 |

OTHER PUBLICATIONS

Notice of Grounds for Rejection issued in counterpart Korean Patent Appln. No. 10-2018-0090160 dated Nov. 22, 2018, and its English translation.

*Primary Examiner* — Christopher R Lamb
(74) *Attorney, Agent, or Firm* — DLA Piper LLP (US)

(57) ABSTRACT

An improved touch sensor comprising a first sensing electrode unit formed on a substrate in a first direction and a second sensing electrode unit formed on the substrate in a second direction crossing the first direction. A plurality of fine etching patterns are formed in boundary portions of unit transparent electrodes included in the first sensing electrode unit and the second sensing electrode unit. Each unit transparent electrode may have a shape in which a portion of a curved line connecting the vertices of a polygon is removed. Adjacent unit transparent electrodes may be electrically connected to one another. The improved touch sensor prevents a transparent electrode from being visible to a user sensor and also results in the prevention of a reduction in light transmittance caused by the transparent electrode as well as the prevention a reduction in optical quality due to a moiré phenomenon.

14 Claims, 21 Drawing Sheets

(56) References Cited

U.S. PATENT DOCUMENTS

| | | | |
|---|---|---|---|
| 2014/0160374 A1* | 6/2014 | Wang | G06F 3/0443 |
| | | | 349/12 |
| 2015/0242035 A1* | 8/2015 | Kim | G06F 3/0448 |
| | | | 345/173 |
| 2017/0102804 A1* | 4/2017 | Kikukawa | G06F 3/047 |
| 2017/0139525 A1* | 5/2017 | Jo | G06F 3/046 |
| 2017/0344162 A1* | 11/2017 | Lee | G06F 3/0412 |
| 2019/0018518 A1* | 1/2019 | Choi | G06F 3/0443 |

* cited by examiner

TOUCH SENSOR

CROSS-REFERENCE TO RELATED PATENT APPLICATION

This U.S. non-provisional patent application claims priority under 35 U.S.C. § 119 of Korean Patent Application No. 10-2018-0090160 filed on Aug. 2, 2018 in the Korean Patent Office, the entire contents of which are hereby incorporated by reference.

BACKGROUND

Technical Field

The present invention relates to a touch sensor. More particularly, the present invention relates to a touch sensor capable of preventing a reduction in light transmittance due to a transparent electrode and a reduction in optical quality due to a moiré phenomenon while preventing a transparent electrode from being unnecessarily visible to a user due to a difference in optical characteristics between an electrode region where the transparent electrode is formed and an inter-electrode region where the transparent electrode is not formed by forming unit transparent electrodes distinguished by a plurality of fine etching patterns in the transparent electrode in order to improve visibility and light transmittance.

Description of Related Art

A touch sensor is a device that, when a user comes into contact with an image being displayed on a screen by means of his or her finger or a touch pen, can detect a touch point in response to the contact. A touch sensor is produced as a structure mounted on a display device such as a liquid crystal display (LCD), an organic light-emitting diode (OLED), and the like.

Generally, such a touch sensor includes a touch sensing region including transparent electrodes formed in directions crossing each other as a component for sensing a user's touch operation. The touch sensing region may be divided into an electrode region where transparent electrodes exist and an inter-electrode region where no transparent electrodes exist.

Since the electrode region and the inter-electrode region have different optical characteristics including transmittance and reflectance, the electrode region and the inter-electrode region can be distinguished from each other and thus may be unnecessarily visible to users.

Also, since the electrode region has a relatively low transmittance compared to the inter-electrode region, a pattern of the touch sensor may be visible to users.

Such a conventional problem will be described in detail as follows.

FIG. 1 is a sectional view of a conventional touch sensor, FIG. 2A and FIG. 2B are diagrams showing an example upper shape of the conventional touch sensor disclosed in FIG. 1, and FIG. 3 is a diagram illustrating a principle in which a transparent electrode is visible to a user due to a low-frequency component of a spatial frequency generated by the transparent electrode in the conventional touch sensor disclosed in FIG. 1. The unit of the spatial frequency of FIG. 3 is cycle per degree (CPD).

Referring to FIG. 1 to FIG. 3, the conventional touch sensor includes a first sensing electrode 2 made of indium tin oxide (ITO) and formed on a substrate 1 in a first direction, a second sensing electrode 3 made of ITO and formed in a second direction crossing the first direction, an insulating layer 4 configured to insulate the first sensing electrode 2 from the second sensing electrode 3, a bridge pattern 5 made of ITO and configured to connect two such second sensing electrodes 3, and a device protection layer 6. FIG. 2A shows an example upper shape in which the first sensing electrode 2 and the second sensing electrode 3 are formed, and FIG. 2B shows an example upper shape in which the bridge pattern 5 is formed in addition to the first sensing electrode 2 and the second sensing electrode 3.

For the conventional touch sensor, ITO has differences in optical characteristics such as transmittance/reflectance, transparent/reflective color sense, and the like depending on thickness. Thus, there arises a difference in optical characteristics between an electrode region where ITO is formed and an inter-electrode region where no ITO is formed, and transmitted light and reflected light cause an ITO pattern to be visible to users.

Also, since ITO with a large pitch and thickness is applied to the bridge pattern 5 in order to secure channel resistance, the bridge pattern 5 may be visible to users when external light is emitted to the touch sensor.

The visibility reduction is mainly caused by a low-frequency component of a spatial frequency generated by the first sensing electrode 2, the second sensing electrode 3, and the bridge pattern 5. That is, since the first sensing electrode 2, the second sensing electrode 3, and the bridge pattern 5 are repeatedly formed in the touch sensor at regular spatial intervals, the low-frequency component of the spatial frequency corresponding to the spatial distribution periodicity of the first sensing electrode 2, the second sensing electrode 3, and the bridge pattern 5 is reinforced when external light is emitted to the touch sensor. Thus, ITO itself included in the first sensing electrode 2, the second sensing electrode 3, and the bridge pattern 5 and an edge region of ITO may be unnecessarily visible to users.

Also, when the conventional touch sensor having such a problem is bonded to a display panel, interference may occur between a pixel array of the display panel and a pixel array of the touch sensor, and an optical interference pattern may be exhibited as a moiré pattern. A moiré phenomenon, which is a defect different from a pattern visibility defect of a touch sensor, acts as a cause which reduces the optical quality of an imaging apparatus due to exhibition of an undesired two-dimensional spatial frequency form caused by interference between two arrays.

RELATED ART DOCUMENTS

Patent Documents

Korea Patent Publication No. 10-2014-0051649 (Published on May 2, 2014, entitled "METAL MESH TYPE TOUCH SCREEN PANEL")

SUMMARY

1. Technical Problem

A technical objective of the present invention is to prevent a transparent electrode from being unnecessarily visible to a user due to a difference in optical characteristics between an electrode region where the transparent electrode is formed and an inter-electrode region where no transparent electrode is formed and also to prevent a reduction in light transmittance due to the transparent electrode by forming unit transparent electrodes distinguished by a plurality of fine etching patterns on the transparent electrode in order to improve visibility and light transmittance of the transparent electrode.

Another technical objective of the present invention is to increase light transmittance of a touch sensor and also to enhance the visibility of the touch sensor by converting a low-frequency component of a spatial frequency induced by transparent electrodes that are repeatedly formed inside the touch sensor at regular spatial intervals into a high-frequency component that is not visible to a user by means of unit transparent electrodes distinguished by a plurality of fine etching patterns formed in each of the transparent electrodes.

Yet another technical objective of the present invention is to prevent an optical interference pattern due to interference between a pixel array of a touch sensor and a pixel array of a display panel from being exhibited as a moiré pattern to prevent a reduction in optical quality when the touch sensor is bonded to the display panel.

2. Solution to Problem

A touch sensor according to a first aspect of the present invention includes a first sensing electrode unit formed on a substrate in a first direction and a second sensing electrode unit formed on the substrate in a second direction crossing the first direction, wherein a plurality of fine etching patterns are formed in boundary portions of unit transparent electrodes included in the first sensing electrode unit and the second sensing electrode unit, each unit transparent electrode has a shape in which a portion of a curved line connecting vertices of a polygon is removed, and adjacent unit transparent electrodes are electrically connected to each other.

A touch sensor according to a second aspect of the present invention includes first sensing electrode units formed in a first direction and connected to one another; second sensing electrode units formed in a second direction crossing the first direction and separated from one another; and a bridge electrode unit configured to connect two adjacent second sensing electrodes to each other with one first sensing electrode unit interposed therebetween, wherein a plurality of fine etching patterns are formed in boundary portions of unit transparent electrodes included in the first sensing electrode unit and the second sensing electrode unit, each unit transparent electrode has a shape in which a portion of a curved line connecting vertices of a polygon is removed, and adjacent unit transparent electrodes are electrically connected to each other.

A touch sensor according to a third aspect of the present invention includes first sensing electrode units formed on a substrate and connected to one another in a first direction; an insulating layer formed on the substrate where the first sensing electrodes are formed; and second sensing electrode units formed on the insulating layer and connected to one another in a second direction crossing the first direction; wherein a plurality of fine etching patterns are formed in boundary portions of unit transparent electrodes included in the first sensing electrode unit and the second sensing electrode unit, each unit transparent electrode has a shape in which a portion of a curved line connecting vertices of a polygon is removed, and adjacent unit transparent electrodes are electrically connected to each other.

In the touch sensors according to the first to third aspects of the present invention, a plurality of the unit transparent electrodes distinguished by the fine etching patterns may have a tessellation structure.

In the touch sensors according to the first to third aspects of the present invention, the curved line may include one or more selected from the group consisting of a sine curve, a cosine curve, a conic section, a catenary, a curve of pursuit, a cycloid, a trochoid, and a cardioid.

In the touch sensors according to the first to third aspects of the present invention, the curved line may be a curved line that continuously connects the vertices of the polygon or a curved line that is partially formed by discontinuously connecting the vertices of the polygon.

In the touch sensors according to the first to third aspects of the present invention, the boundary portions of the unit transparent electrodes may have a shape in which a portion of a curved line connecting two adjacent vertices among six vertices of a hexagon is removed.

In the touch sensors according to the first to third aspects of the present invention, the boundary portions of the unit transparent electrodes may have a shape in which a portion of a curved line connecting two adjacent vertices among four vertices of a quadrangle arranged in a lattice structure is removed.

In the touch sensors according to the first to third aspects of the present invention, the boundary portions of the unit transparent electrodes may have a shape in which a portion of a curved line connecting two adjacent vertices among four vertices of a quadrangle arranged in a zigzag structure is removed.

In the touch sensors according to the first to third aspects of the present invention, the boundary portions of the unit transparent electrodes may have a shape in which a portion of a curved line connecting two adjacent vertices among four vertices of a rhombus is removed.

In the touch sensors according to the first to third aspects of the present invention, the boundary portions of the unit transparent electrodes may have a shape in which a portion of a curved line connecting two adjacent vertices among three vertices of a triangle is removed.

In the touch sensors according to the first to third aspects of the present invention, the unit transparent electrodes may have a pitch ranging from 100 µm to 500 µm.

In the touch sensors according to the first to third aspects of the present invention, the fine etching patterns may have a width ranging from 5 µm to 20 µm.

In the touch sensors according to the first to third aspects of the present invention, a connection unit configured to connect adjacent unit transparent electrodes may have a width ranging from 20 µm to 60 µm.

In the touch sensors according to the first to third aspects of the present invention, the first sensing electrode unit and the second sensing electrode unit may have transmittance increased by the plurality of fine etching patterns formed in the boundary portions of the unit transparent electrodes.

In the touch sensors according to the first to third aspects of the present invention, the unit transparent electrodes may be formed by the plurality of fine etching patterns, the first sensing electrode unit and the second sensing electrode unit may be distinguished by being the same shape as that of the fine etching patterns included in each of the unit transparent electrodes, and a spatial high-frequency component may be disposed on the front surface of the touch sensor.

The touch sensors according to the first to third aspects of the present invention may further include an inter-electrode dummy that is formed between the first sensing electrode unit and the second sensing electrode unit and that is electrically insulated from the unit transparent electrodes, the inter-electrode dummy having the same shape as the unit transparent electrodes.

In the touch sensors according to the first to third aspects of the present invention, by inserting a plurality of dummy patterns having the same spatial frequency as the fine etching patterns into a space between the first sensing electrode unit and the second sensing electrode unit to dispose the same high-frequency component on the front surface of the touch sensor, it is possible to prevent a touch sensor pattern from being visible due to the same high-frequency component disposed on the front surface of the touch sensor.

In the touch sensor according to the second aspect of the present invention, the bridge electrode unit may have one kind of shape selected from among a straight line, a curved line, and a dumbbell shape in which both ends are circular and a middle portion is formed as a straight line.

In the touch sensor according to the second aspect of the present invention, the bridge electrode unit may have a width ranging from 2 μm to 10 μm.

In the touch sensor according to the second aspect of the present invention, the bridge electrode unit may contain indium tin oxide (ITO) and have a length ranging from 100 μm to 500 μm.

In the touch sensor according to the second aspect of the present invention, the bridge electrode unit may have a width ranging from 15 μm to 60 μm.

3. Advantageous Effects

According to the present invention, by forming unit transparent electrodes distinguished by a plurality of fine etching patterns on a transparent electrode in order to improve visibility and light transmittance of the transparent electrode, it is possible to prevent the transparent electrode from being unnecessarily visible to a user due to a difference in optical characteristics between an electrode region where the transparent electrode is formed and an inter-electrode region where no transparent electrode is formed and also to prevent a reduction in light transmittance due to the transparent electrode.

Also, by converting a low frequency component of a spatial frequency induced by transparent electrodes that are repeatedly formed inside a touch sensor at regular spatial intervals into a high-frequency component that is not visible to a user by means of unit transparent electrodes distinguished by a plurality of fine etching patterns formed in each of the transparent electrode, it is possible to increase the light transmittance of the touch sensor and also to enhance the visibility of the touch sensor.

Also, when a touch sensor is bonded to a display panel, it is possible to prevent an optical interference pattern due to interference between a pixel array of the touch sensor and a pixel array of the display panel from being exhibited as a moiré pattern and also to prevent a reduction in optical quality.

DETAILED DESCRIPTION OF EMBODIMENTS

Figure 1:
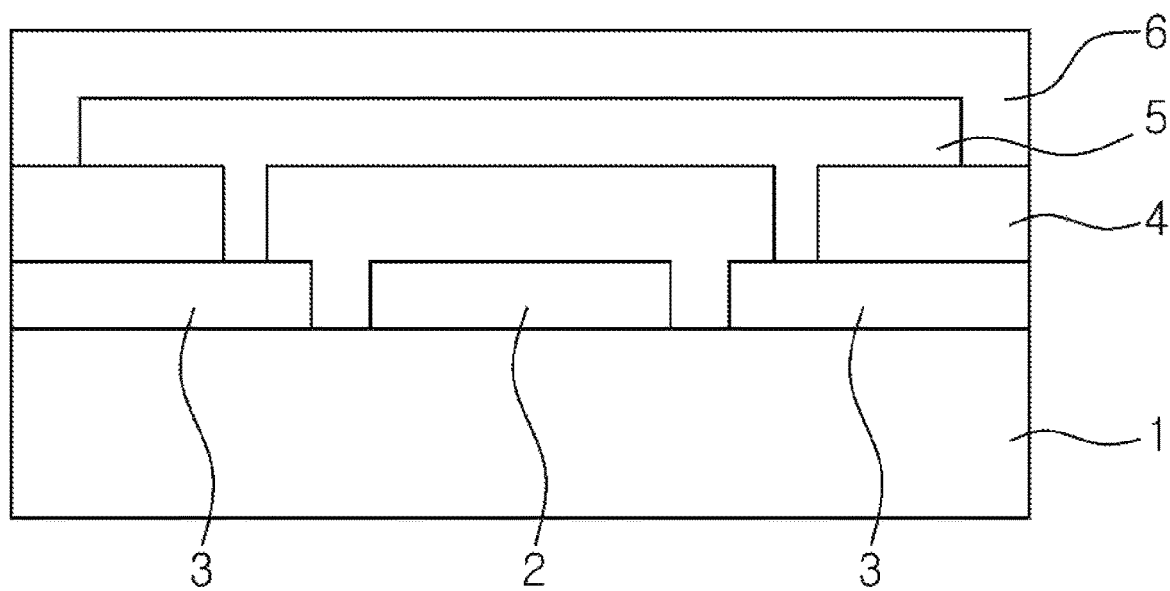
FIG. 1 is a sectional view of a conventional touch sensor.
Figure 2A:
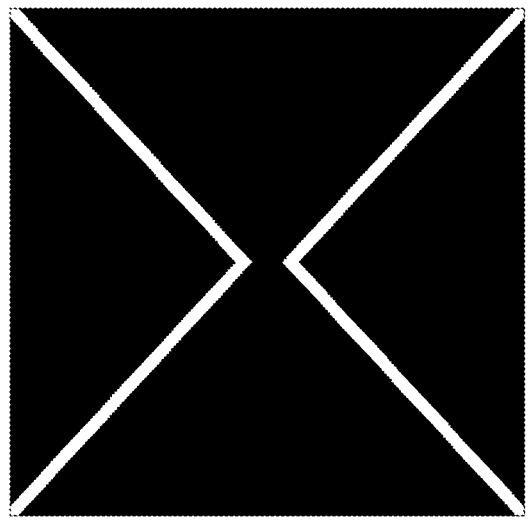
FIG. 2A and FIG. 2B are diagrams showing example upper shapes of the conventional touch sensor disclosed in FIG. 1.
Figure 2B:
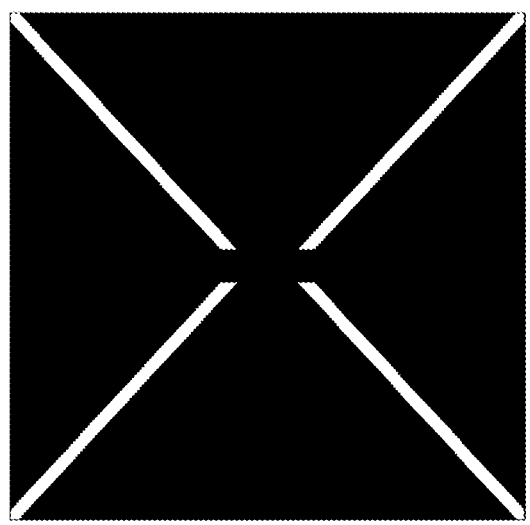

As specific structural or functional descriptions for the embodiments according to the concept of the invention disclosed herein are merely exemplified for purposes of describing the embodiments according to the concept of the invention, the embodiments according to the concept of the invention may be embodied in various forms but are not limited to the embodiments described herein.

While the embodiments of the present invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, or groups thereof, but do not preclude the presence or addition of one or more other features, integers, steps, operations, elements, components, and/or groups thereof.

Unless otherwise defined, all terms (including technical or scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 4:
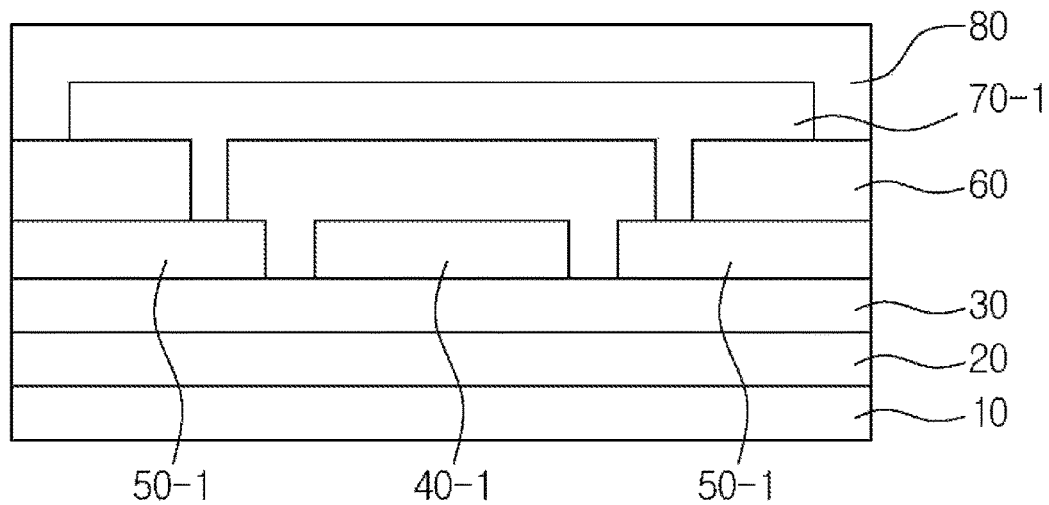
FIG. 4 is an example sectional view of a touch sensor according to a first embodiment of the present invention.
Figure 5:
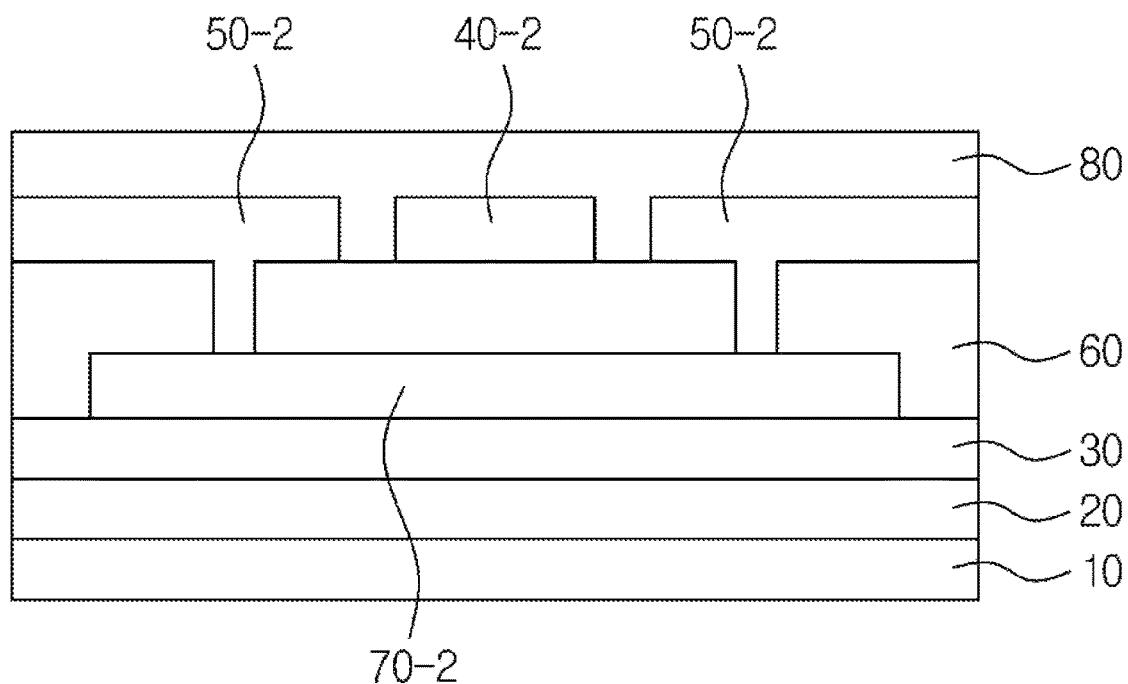
FIG. 5 is an example sectional view of a touch sensor according to a second embodiment of the present invention.
Figure 6:
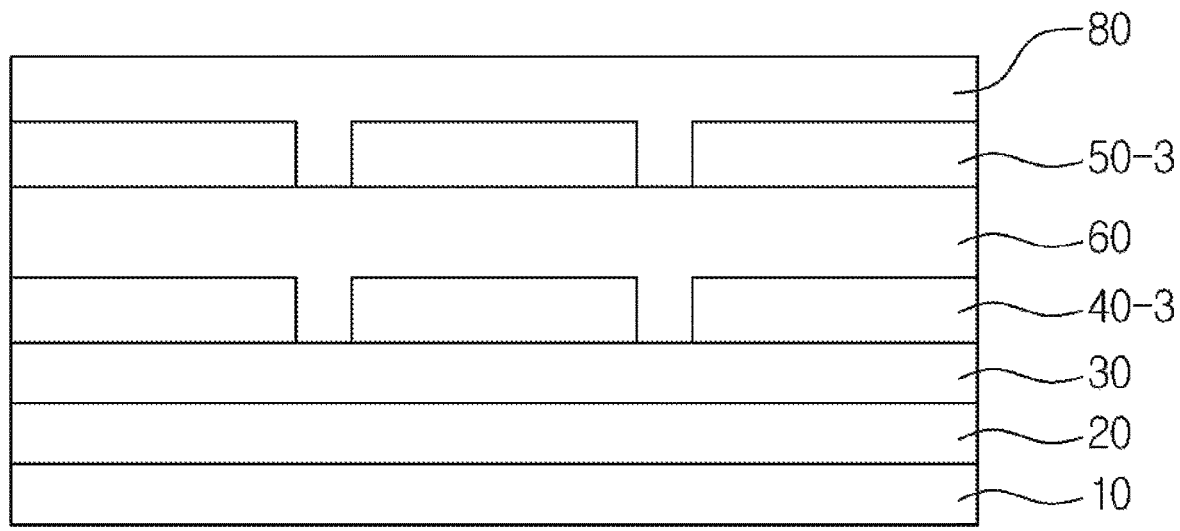
FIG. 6 is an example sectional view of a touch sensor according to a third embodiment of the present invention.

As will described below, FIG. 4 is a sectional view illustrating a first embodiment having an upper bridge structure, FIG. 5 is a sectional view illustrating a second embodiment having a lower bridge structure, and FIG. 6 illustrates a third embodiment of a counter electrode structure which uses no bridge electrode.

First, technical features of the present invention that can be applied regardless of the stacked structures of the first to third embodiments will be briefly described as follows.

Regardless of the stacked structures of the first to third embodiments, the present invention includes a first sensing electrode unit formed on a substrate in a first direction and a second sensing electrode unit formed on the substrate in a second direction crossing the first direction. A plurality of fine etching patterns are formed in boundary portions of unit transparent electrodes included in the first sensing electrode unit and the second sensing electrode unit. Each unit transparent electrode may have a shape in which a portion of a curved line connecting the vertices of a polygon is removed. Adjacent unit transparent electrodes may be electrically connected to one another.

The detailed description of the first to third embodiments can be applied to the plurality of fine etching patterns and the unit transparent electrodes distinguished by the fine etching patterns, and thus a redundant description thereof will be omitted.

FIG. 4 is an example sectional view of a touch sensor according to a first embodiment of the present invention.

Referring to FIG. 4, the touch sensor according to the first embodiment of the present invention includes a substrate 10, a first sensing electrode unit 40-1, a second sensing electrode unit 50-1, an insulating layer 60, a bridge electrode unit 70-1, and a device protection layer 80. It should be noted that the first embodiment of the present invention is associated with an upper bridge structure in which the bridge electrode unit 70-1 is located over the first sensing electrode unit 40-1 and the second sensing electrode unit 50-1 and the following second embodiment is associated with a lower bridge structure.

As will be described later, the main technical features of the touch sensor according to the first embodiment of the present invention are that the plurality of fine etching patterns are formed in the boundary portions of the unit transparent electrodes included in the first sensing electrode 40-1 and the second sensing electrode unit 50-1, that each unit transparent electrode has a shape in which a portion of the curved line connecting the vertices of the polygon is removed, and that adjacent unit transparent electrodes are electrically connected to one another.

For example, the plurality of unit transparent electrodes distinguished by the fine etching patterns may be configured to have a tessellation structure. More preferably, the plurality of unit transparent electrodes may be configured to have a regular tessellation structure. The regular tessellation structure is a tessellation structure consisting of only one type of regular polygon.

Also, for example, the curved line may include one or more selected from the group consisting of a sine curve, a cosine curve, a conic section, a catenary, a curve of pursuit, a cycloid, a trochoid, and a cardioid and may be a curved line that continuously connects the vertices of the polygon or a curved line that is partially formed by discontinuously connecting the vertices of the polygon.

Figure 3:
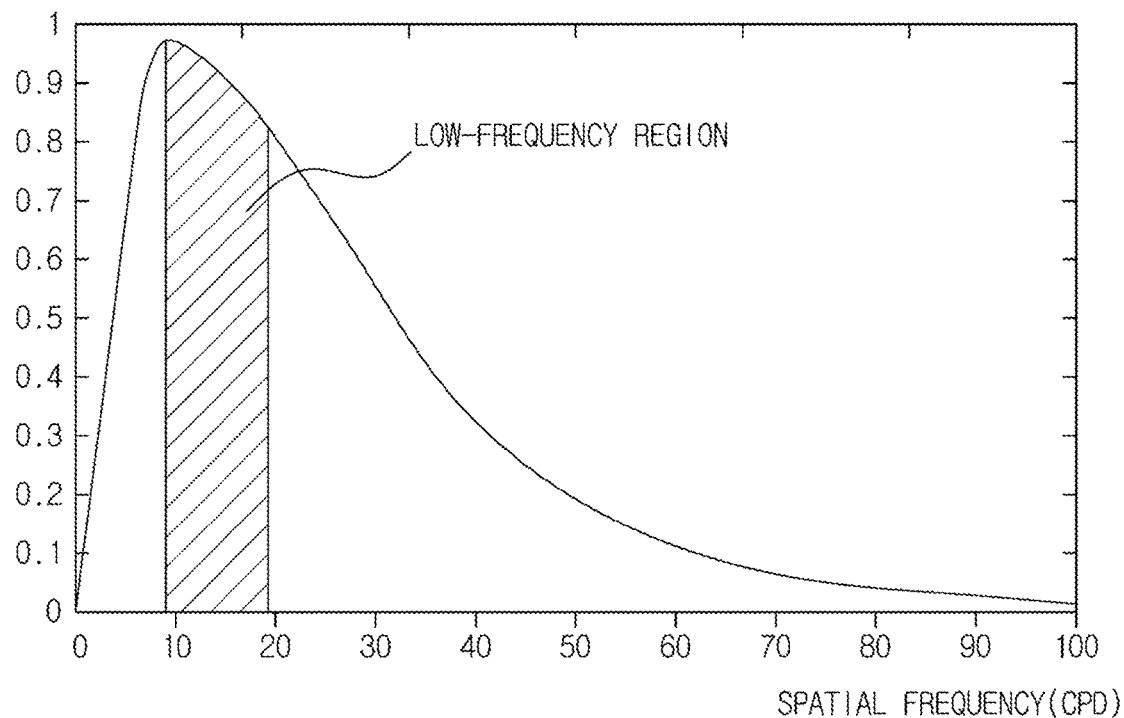
FIG. 3 is a diagram illustrating a principle in which a transparent electrode is visible to a user due to a low-frequency component of a spatial frequency generated by the transparent electrode in the conventional touch sensor disclosed in FIG. 1.
Figure 15:
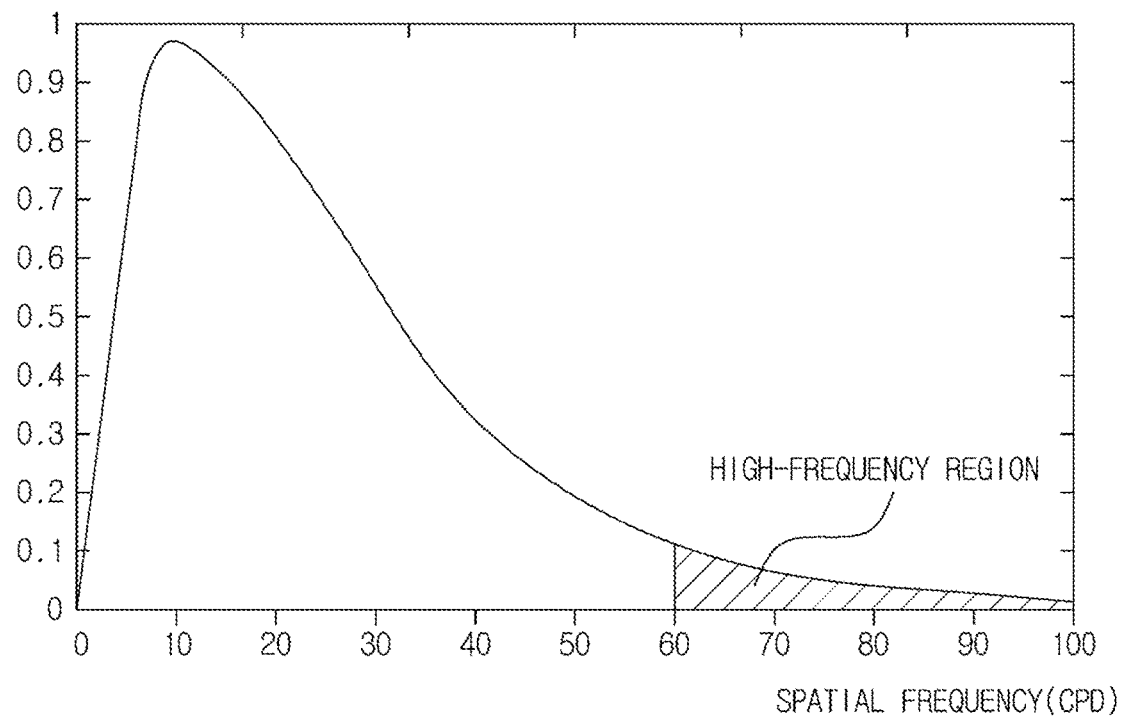
FIG. 15 is a diagram illustrating a principle in which a low-frequency component of a spatial frequency generated by a transparent electrode is converted into a high-frequency component that is not visible to a user by a plurality of transparent fine patterns in the touch sensor according to embodiments of the present invention.

Referring to FIG. 3, which has been referred to while the problems of the conventional touch sensor were described, and additionally referring to FIG. 15, which is a diagram illustrating a principle in which, in the touch sensor according to the first embodiment of the present invention, a low-frequency component of a spatial frequency generated by a transparent electrode is converted into a high-frequency component which is not visible to a user by a plurality of fine etching patterns formed in boundary portions of unit transparent electrodes, the unit transparent electrodes are formed by the plurality of fine etching patterns, the first sensing electrode unit 40-1 and the second sensing electrode unit 50-1 are distinguished by being the same shape as that of the fine etching patterns included in each unit transparent electrode, and a spatial high-frequency component is disposed on the front of the touch sensor. In other words, the plurality of fine etching patterns formed in the boundary portions of the unit transparent electrodes included in the first sensing electrode unit 40-1 and the second sensing electrode unit 50-1 may be repeatedly formed inside the touch sensor at regular spatial intervals. Also, a low-frequency component of a spatial frequency induced by the first sensing electrode unit 40-1 and the second sensing electrode unit 50-1 having a relatively larger pitch than the fine etching patterns may be converted into a high-frequency component that is not visible to the user. Thus, it is possible to improve the visibility of the touch sensor. Also, the total light transmittance of the touch sensor increases along with an increase in the transmittance of the first sensing electrode unit 40-1 and the second sensing electrode unit 50-1 due to the plurality of fine etching patterns formed in the boundary portions of the unit transparent electrodes. The unit of the spatial frequency of FIG. 15 is cycle per degree (CPD). According to embodiments of the present invention, it can be seen that the minimum value of the spatial frequency is about 60 CPD or less and the low-frequency component of the spatial frequency generated by the transparent electrode is converted into a high-frequency component of at least 60 CPD or greater which is not visible to the user due to the plurality of fine etching patterns, which are technical features of the present invention.

Exemplary shapes of the unit transparent electrodes distinguished by fine etching patterns that may be applied to the touch sensor according to the first embodiment of the present invention will be described below.

<First Unit Transparent Electrode 101>

FIG. 7A to FIG. 7D are diagrams showing one exemplary planar shape of unit transparent electrodes 101 included in the first sensing electrode unit 40-1 and the second sensing electrode unit 50-1 according to embodiments of the present invention, and FIG. 8A to FIG. 8D are diagrams illustrating a process of forming the unit transparent electrodes 101 illustrated in FIG. 7A to FIG. 7D.

Additionally referring to FIG. 7A to FIG. 8D, boundary portions of the unit transparent electrodes 101 included in the first sensing electrode unit 40-1 and the second sensing electrode unit 50-1 have a shape in which a portion of a curved line connecting two adjacent vertices among the six vertices of a hexagon is etched out and removed, and the etched and removed portion is a fine etching pattern.

For example, the unit transparent electrodes 101 distinguished by such fine etching patterns may have a shape corresponding to the hexagon, and the plurality of unit transparent electrodes 101 included in the first sensing electrode unit 40-1 and the second sensing electrode unit 50-1 may have a tessellation structure in which the hexagon is regularly and repeatedly arranged. More preferably, the plurality of unit transparent electrodes 101 may have a regular tessellation structure in which a regular hexagon is regularly and repeatedly arranged.

Figure 7A:
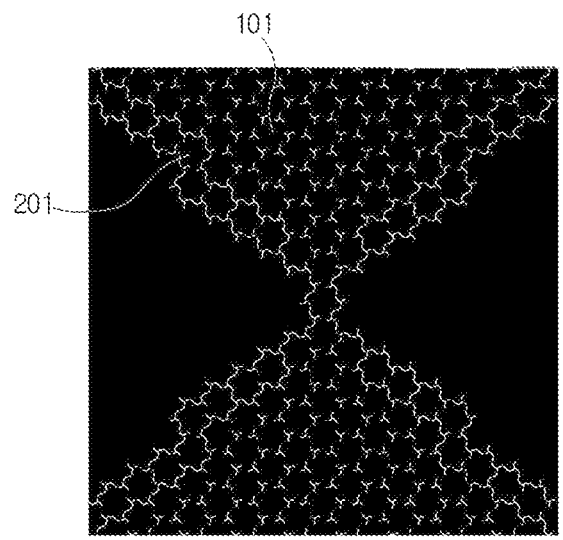
FIG. 7A to FIG. 7D are diagrams showing one exemplary planar shape of a transparent fine pattern included in a first sensing electrode unit and a second sensing electrode unit according to embodiments of the present invention.
Figure 7B:
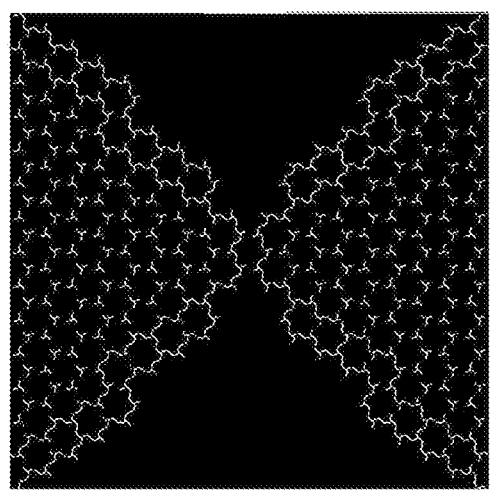
Figure 7C:
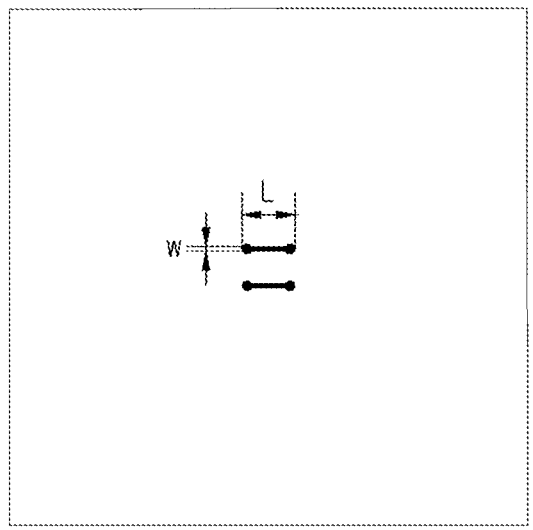
Figure 7D:
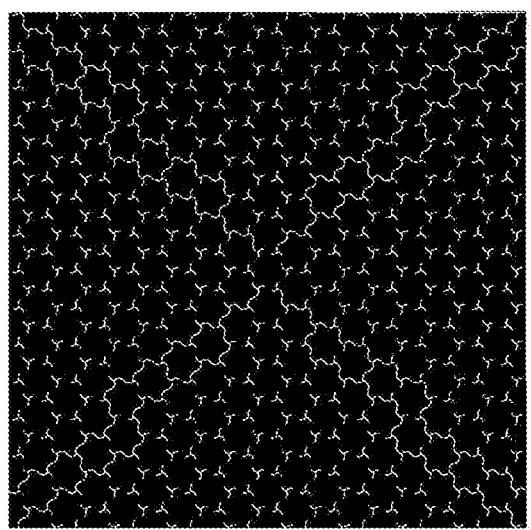

FIG. 7A shows a planar shape of the plurality of unit transparent electrodes 101 distinguished by the fine etching patterns included in the first sensing electrode unit 40-1. FIG. 7B shows a planar shape of the plurality of unit transparent electrodes 101 distinguished by the fine etching patterns included in the second sensing electrode unit 50-1. FIG. 7C shows a planar shape of the bridge electrode unit 70-1. FIG. 7D shows a planar shape of the touch sensor including the plurality of unit transparent electrodes 101 included in the first sensing electrode unit 40-1 illustrated in FIG. 7A, the plurality of unit transparent electrodes 101 included in the second sensing electrode unit 50-1 illustrated in FIG. 7B, and the bridge electrode unit 70-1 illustrated in FIG. 7C.

For example, as illustrated in FIG. 7A to FIG. 7D, when an inter-electrode region formed by an interval between the first sensing electrode unit 40-1 and the second sensing electrode unit 50-1 has a large width, an inter-electrode dummy 201 which has the same shape as the unit transparent electrodes 101 and which is electrically insulated from the unit transparent electrodes 101 included in the first sensing electrode unit 40-1 and the second sensing electrode unit 50-1 may be additionally formed. As disclosed in FIG. 7A to FIG. 7D, the plurality of unit transparent electrodes 101 included in the first sensing electrode unit 40-1 and the second sensing electrode unit 50-1 are electrically connected to one another, whereas the inter-electrode dummy 201 present in the inter-electrode region is electrically insulated from the unit transparent electrodes 101. When the inter-electrode dummy 201 is utilized, a plurality of dummy patterns having the same spatial frequency as the fine etching patterns may be inserted into a space between the first sensing electrode unit 40-1 and the second sensing electrode unit 50-1 to dispose the same high-frequency component on the front surface of the touch sensor. Thus, the same high-frequency component disposed on the front surface of the touch sensor can prevent a touch sensor pattern from being visible.

In FIG. 7C, the bridge electrode unit 70-1 is represented as a dumbbell shape in which both ends are circular and a middle portion is formed as a straight line. However, this is merely an example, and the bridge electrode unit 70-1 may be formed as a straight line or a curved line.

As an example, the bridge electrode unit 70-1 may have a material containing metal. In this case, the bridge electrode unit 70-1 may have a length ranging from 100 μm to 500 μm and a width ranging from 2 μm to 10 μm.

As another example, the bridge electrode unit 70-1 may have a material containing indium tin oxide (ITO). In this case, the bridge electrode unit 70-1 may have a length ranging from 100 μm to 500 μm and a width ranging from 15 μm to 60 μm.

Metal has higher electrical conductivity but lower transparency than ITO. Thus, by allowing the bridge electrode unit 70-1 to have a shorter width when the bridge electrode unit 70-1 is made of metal than when the bridge electrode unit 70-1 is made of ITO, it is possible to improve the visibility of the touch sensor to which the bridge electrode unit 70-1 made of metal is applied.

A process of forming the plurality of unit transparent electrodes 101 illustrated in FIG. 7A to FIG. 7D is described with reference to FIG. 8A to FIG. 8D as follows.

Figure 8A:
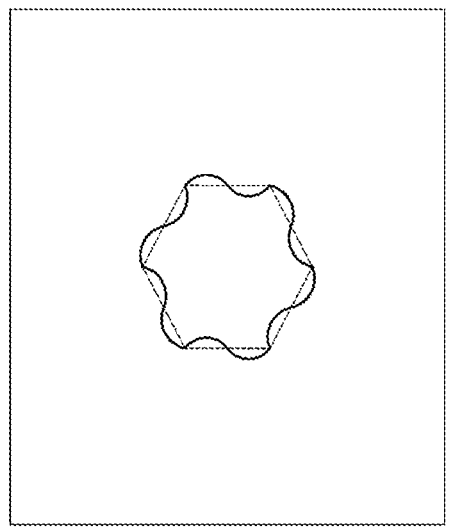
FIG. 8A to FIG. 8D are diagrams illustrating a process of forming the transparent fine pattern illustrated in FIG. 7A to FIG. 7D.
Figure 8B:
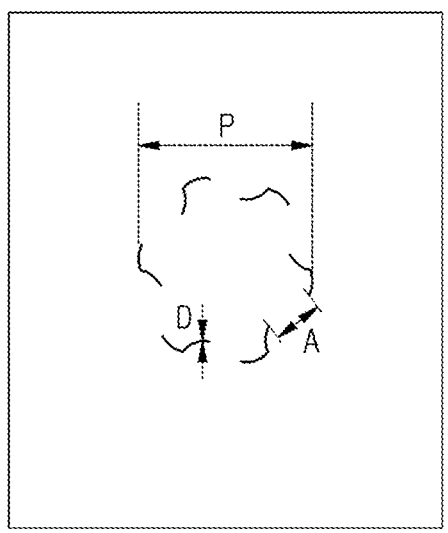

In FIG. 8A and FIG. 8B, for convenience of understanding, ITO is represented in white, and the etched portion is represented in black. In FIG. 7A, FIG. 7B, FIG. 7D, FIG. 8C, and FIG. 8D, a black region indicates ITO, and a white region indicates a portion to be etched out and removed.

Figure 8C:
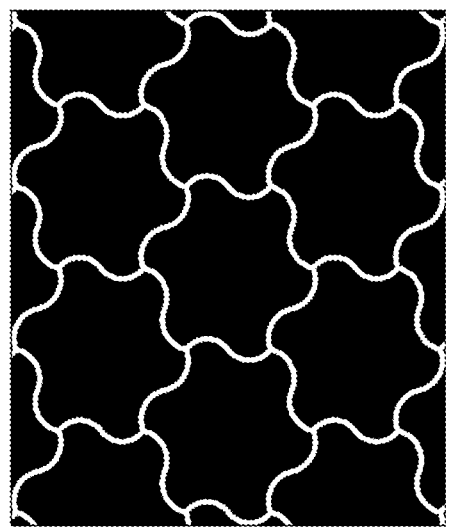

First, referring to FIG. 8A, in order to form one unit transparent electrode 101, a virtual hexagon represented by a dotted line in the transparent electrode made of the material such as ITO is assumed, and two adjacent vertices are connected using a curved line such as a sinusoidal wave. This process is repeatedly performed on six vertices. As a result, six curved lines are connected to one another with respect to one virtual hexagon. It will be appreciated that this process is performed on all of the unit transparent electrodes as shown in FIG. 8C.

Figure 8D:
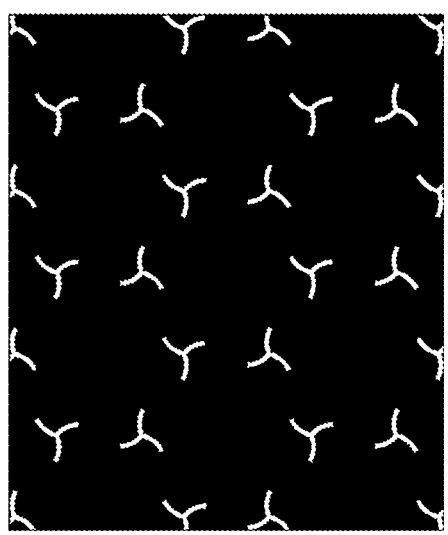

Next, referring to FIG. 8B, one unit transparent electrode 101 is formed by partially removing the curved lines connected to one another. In FIG. 8B, a white background region indicates ITO, and a black curved line is a portion to be removed through etching. This portion is a fine etching pattern. This process is performed on all of the unit transparent electrodes 101 as shown in FIG. 8D.

For example, the unit transparent electrodes 101 may have a pitch P ranging from 100 μm to 500 μm and an interval (i.e., the width D of the fine etching patterns) ranging from 5 μm to 20 μm. With such a configuration, when external light is applied to the touch sensor, a low-frequency component of a spatial frequency induced by the transparent electrode is converted into a high-frequency component that is not visible to a user, and also the total light transmittance of the touch sensor increases along with an increase in the light transmittance of the electrode region, which is a region where the transparent electrode is present, i.e., the first sensing electrode unit 40-1 and the second sensing electrode unit 50-1.

Also, for example, a connection unit configured to connect adjacent unit transparent electrodes 101 may have a width A ranging from 20 μm to 60 μm. With such a configuration, it is possible to prevent an increase in resistance that may occur during a process of connecting adjacent unit transparent electrodes 101 and also prevent a reduction in visibility caused by the connection unit.

<Second Unit Transparent Electrode 102>

FIG. 9A to FIG. 9D are diagrams showing another exemplary planar shape of unit transparent electrodes 102 included in the first sensing electrode unit 40-1 and the second sensing electrode unit 50-1 according to embodiments of the present invention, and FIG. 10A to FIG. 10D are diagrams illustrating a process of forming the unit transparent electrodes 102 illustrated in FIG. 9A to FIG. 9D.

Additionally referring to FIG. 9A to FIG. 10D, boundary portions of the unit transparent electrodes 102 included in the first sensing electrode unit 40-1 and the second sensing electrode unit 50-1 have a shape in which a portion of a curved line connecting two adjacent vertices among the four vertices of a quadrangle arranged in a lattice structure is etched out and removed, and the etched and removed portion is a fine etching pattern.

For example, the unit transparent electrodes 102 distinguished by such fine etching patterns may have a shape corresponding to the quadrangle, and the plurality of unit transparent electrodes 102 included in the first sensing electrode unit 40-1 and the second sensing electrode unit 50-1 may have a tessellation structure in which the quadrangle is regularly and repeatedly arranged. More preferably, the plurality of unit transparent electrodes 102 may have a regular tessellation structure in which a regular quadrangle is regularly and repeatedly arranged.

Figure 9A:
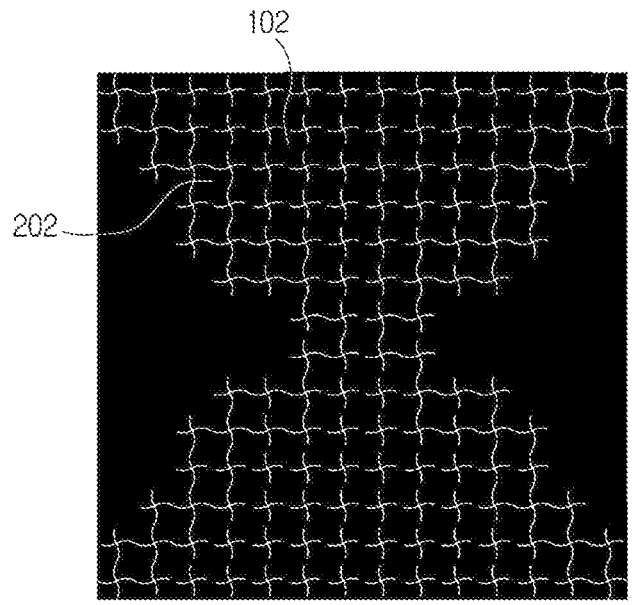
FIG. 9A to FIG. 9D are diagrams showing another exemplary planar shape of the transparent fine pattern included in the first sensing electrode unit and the second sensing electrode unit according to embodiments of the present invention.
Figure 9B:
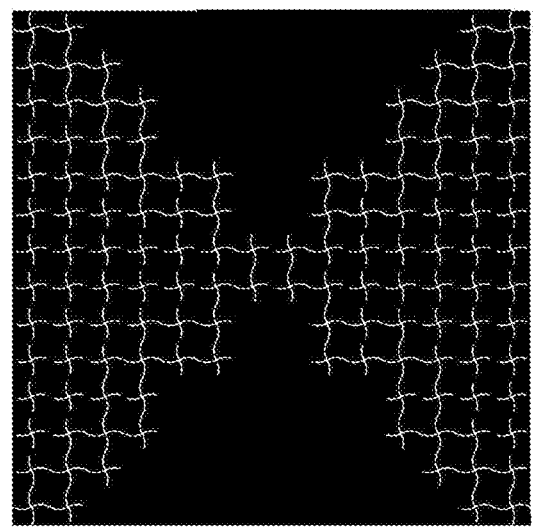
Figure 9C:
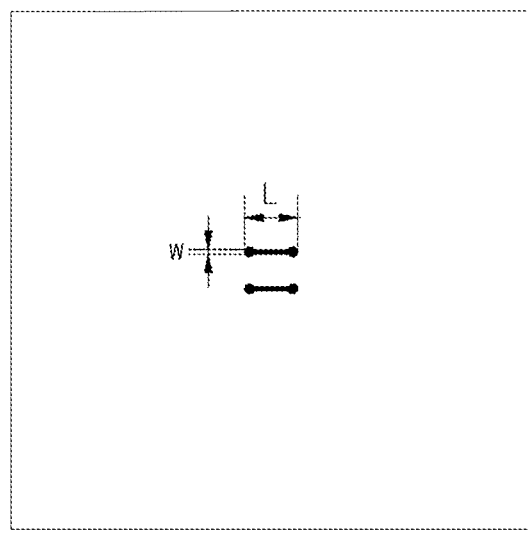
Figure 9D:
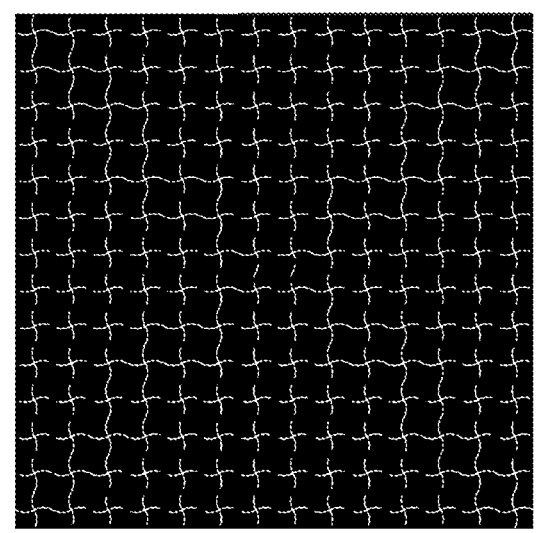

FIG. 9A shows a planar shape of the plurality of unit transparent electrodes 102 distinguished by the fine etching patterns included in the first sensing electrode unit 40-1. FIG. 9B shows a planar shape of the plurality of unit transparent electrodes 102 distinguished by the fine etching patterns included in the second sensing electrode unit 50-1. FIG. 9C shows a planar shape of the bridge electrode unit 70-1. FIG. 9D shows a planar shape of the touch sensor including the plurality of unit transparent electrodes 102 included in the first sensing electrode unit 40-1 illustrated in FIG. 9A, the plurality of unit transparent electrodes 102 included in the second sensing electrode unit 50-1 illustrated in FIG. 9B, and the bridge electrode unit 70-1 illustrated in FIG. 9C.

For example, as illustrated in FIG. 9A to FIG. 9D, when an inter-electrode region formed by an interval between the first sensing electrode unit 40-1 and the second sensing electrode unit 50-1 has a large width, an inter-electrode dummy 202 which has the same shape as the unit transparent electrodes 102 and which is electrically insulated from the unit transparent electrodes 102 included in the first sensing electrode unit 40-1 and the second sensing electrode unit 50-1 may be additionally formed. As disclosed in FIG. 9A to FIG. 9D, the plurality of unit transparent electrodes 102 included in the first sensing electrode unit 40-1 and the second sensing electrode unit 50-1 are electrically connected to one another, whereas the inter-electrode dummy 202 present in the inter-electrode region is electrically insulated from the unit transparent electrodes 102. When the inter-electrode dummy 202 is utilized, a plurality of dummy patterns having the same spatial frequency as the fine etching patterns may be inserted into a space between the first sensing electrode unit 40-1 and the second sensing electrode unit 50-1 to dispose the same high-frequency component on the front surface of the touch sensor. Thus, it is possible to prevent a touch sensor pattern from being visible by means of the same high-frequency component disposed on the front surface of the touch sensor.

In FIG. 9C, the bridge electrode unit 70-1 is represented as a dumbbell shape in which both ends are circular and a middle portion is formed as a straight line. However, this is merely an example, and the bridge electrode unit 70-1 may be a straight line or a curved line.

As an example, the bridge electrode unit 70-1 may have a material containing metal. In this case, the bridge electrode unit 70-1 may have a length ranging from 100 μm to 500 μm and a width ranging from 2 μm to 10 μm.

As another example, the bridge electrode unit 70-1 may have a material containing ITO. In this case, the bridge electrode unit 70-1 may have a length ranging from 100 μm to 500 μm and a width ranging from 15 μm to 60 μm.

Metal has higher electrical conductivity but lower transparency than ITO. Thus, by allowing the bridge electrode unit 70-1 to have a shorter width when the bridge electrode unit 70-1 is made of metal than when the bridge electrode unit 70-1 is made of ITO, it is possible to improve the visibility of the touch sensor to which the bridge electrode unit 70-1 made of metal is applied.

A process of forming the plurality of unit transparent electrodes 102 illustrated in FIG. 9A to FIG. 9D is described with reference to FIG. 10A to FIG. 10D as follows.

Figure 10A:
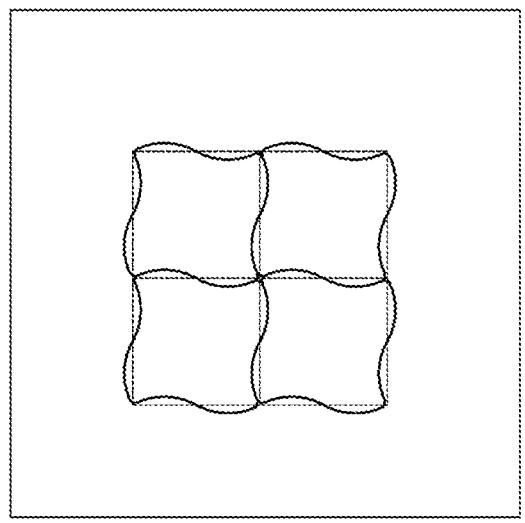
FIG. 10A to FIG. 10D are diagrams illustrating a process of forming the transparent fine pattern illustrated in FIG. 9A to FIG. 9D.
Figure 10B:
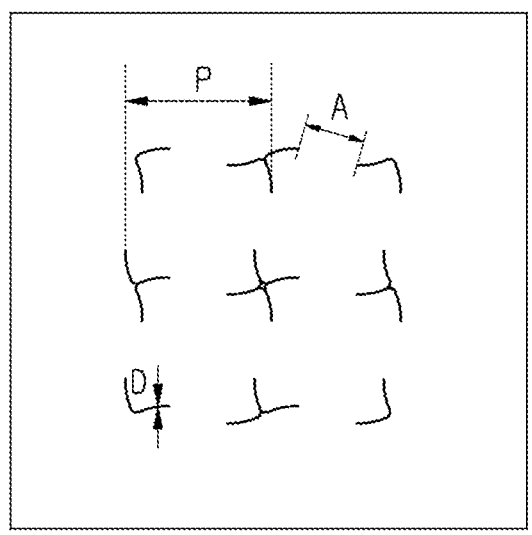

In FIG. 10A and FIG. 10B, for convenience of understanding, ITO is represented in white, and the etched portion is represented in black. In FIG. 9A, FIG. 9B, FIG. 9D, FIG. 10C, and FIG. 10D, a black region indicates ITO, and a white region indicates a portion to be etched out and removed.

Figure 10C:
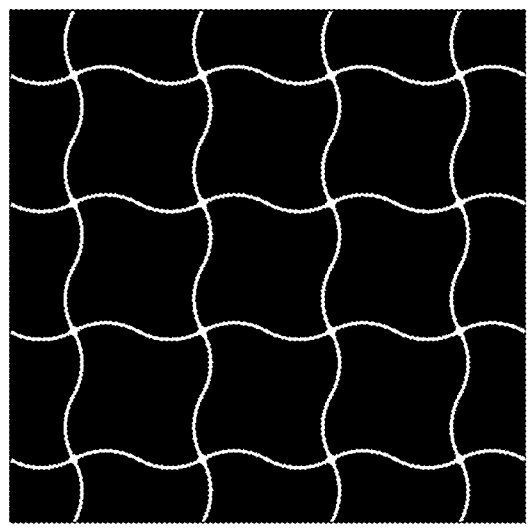

First, referring to FIG. 10A, in order to form one unit transparent electrode 102, a virtual quadrangle represented by a dotted line in the transparent electrode made of the material such as ITO is assumed, and two adjacent vertices are connected using a curved line such as a sinusoidal wave. This process is repeatedly performed on four vertices. As a result, four curved lines are connected to one another with respect to one virtual quadrangle. It will be appreciated that this process is performed on all of the unit transparent electrodes 102 as shown in FIG. 10C.

Figure 10D:
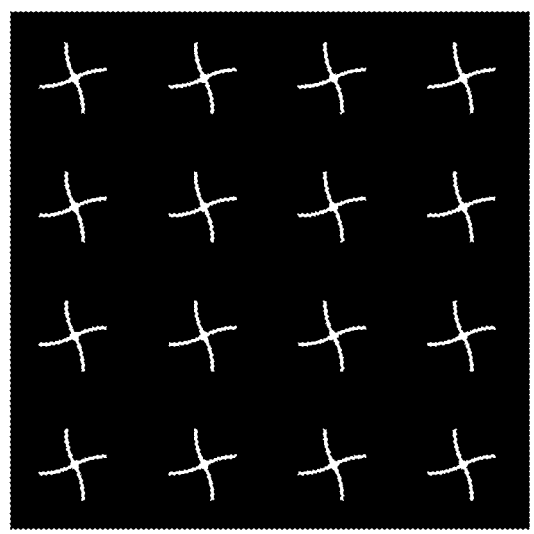

Next, referring to FIG. 10B, one unit transparent electrode 102 is formed by partially removing the curved lines connected to one another. In FIG. 10B, a white background region indicates ITO, and a black curved line is a portion to be removed through etching. This portion is a fine etching pattern. This process is performed on all of the unit transparent electrodes 102 as shown in FIG. 10D.

For example, the unit transparent electrodes 102 may have a pitch P ranging from 100 μm to 500 μm and an interval (i.e., the width D of the fine etching patterns) ranging from 5 μm to 20 μm. With such a configuration, when external light is applied to the touch sensor, a low-frequency component of a spatial frequency induced by the transparent electrode is converted into a high-frequency component that is not visible to a user, and also the total light transmittance of the touch sensor increases along with an increase in the light transmittance of the electrode region, which is a region where the transparent electrode is present, i.e., the first sensing electrode unit 40-1 and the second sensing electrode unit 50-1.

Also, for example, a connection unit configured to connect adjacent unit transparent electrodes 102 may have a width A ranging from 20 μm to 60 μm. With such a configuration, it is possible to prevent an increase in resistance that may occur during a process of connecting adjacent unit transparent electrodes 102 and also to prevent a reduction in visibility caused by the connection unit.

<Third Unit Transparent Electrode 103>

FIG. 11A to FIG. 11D are diagrams showing another exemplary planar shape of unit transparent electrodes 103 included in the first sensing electrode unit 40-1 and the second sensing electrode unit 50-1 according to embodiments of the present invention, and FIG. 12A to FIG. 12D are diagrams illustrating a process of forming the unit transparent electrodes 103 illustrated in FIG. 11A to FIG. 11D.

Additionally referring to FIG. 11A to FIG. 12D, boundary portions of the unit transparent electrodes 103 included in the first sensing electrode unit 40-1 and the second sensing electrode unit 50-1 have a shape in which a portion of a curved line connecting two adjacent vertices among the four vertices of a quadrangle arranged in a zigzag structure is etched out and removed, and the etched and removed portion is a fine etching pattern.

For example, the unit transparent electrodes 103 distinguished by such fine etching patterns may have a shape corresponding to the quadrangle, and the plurality of unit transparent electrodes 103 included in the first sensing electrode unit 40-1 and the second sensing electrode unit 50-1 may have a tessellation structure in which the quadrangle is regularly and repeatedly arranged. More preferably, the plurality of unit transparent electrodes 103 may have a regular tessellation structure in which a regular quadrangle is regularly and repeatedly arranged.

Figure 11A:
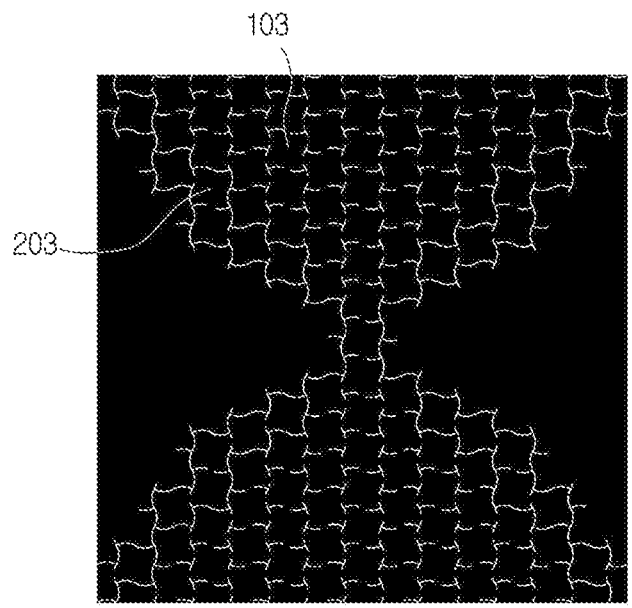
FIG. 11A to FIG. 11D are diagrams showing another exemplary planar shape of a transparent fine pattern included in the first sensing electrode unit and the second sensing electrode unit according to embodiments of the present invention.
Figure 11B:
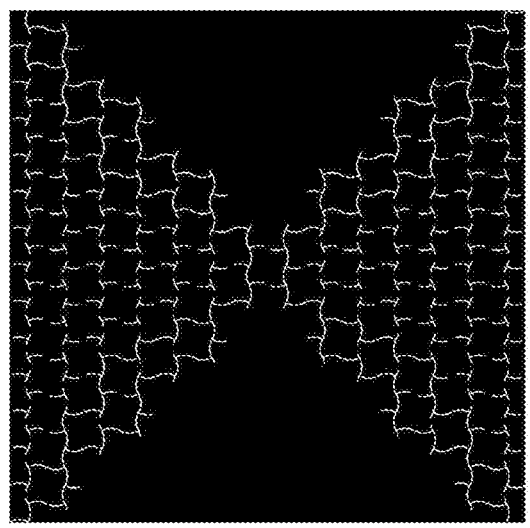
Figure 11C:
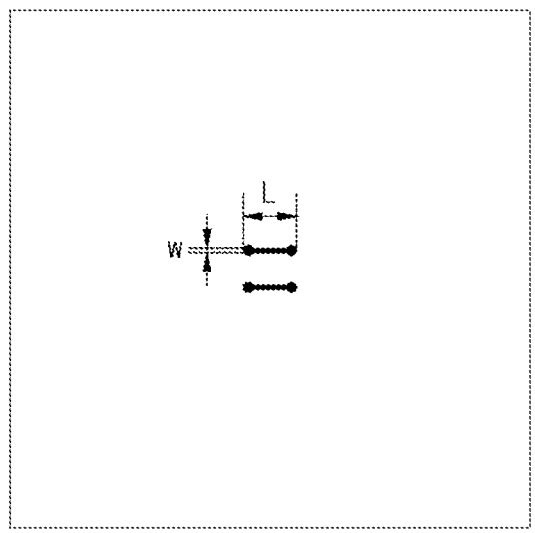
Figure 11D:
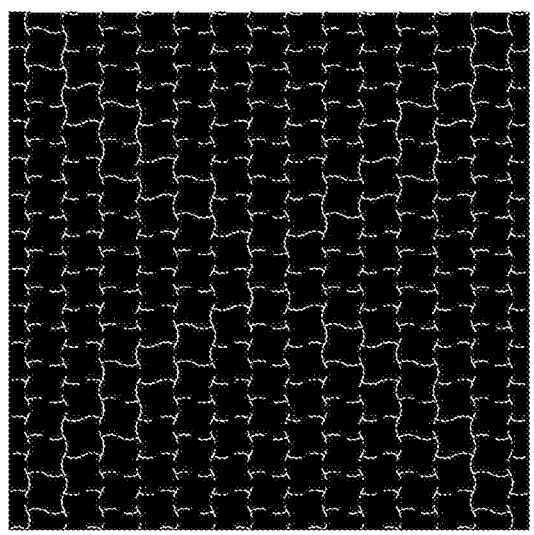

FIG. 11A shows a planar shape of the plurality of unit transparent electrodes 103 distinguished by the fine etching patterns included in the first sensing electrode unit 40-1. FIG. 11B shows a planar shape of the plurality of unit transparent electrodes 103 distinguished by the fine etching patterns included in the second sensing electrode unit 50-1. FIG. 11C shows a planar shape of the bridge electrode unit 70-1. FIG. 11D shows a planar shape of the touch sensor including the plurality of unit transparent electrodes 103 included in the first sensing electrode unit 40-1 illustrated in FIG. 11A, the plurality of unit transparent electrodes 103 included in the second sensing electrode unit 50-1 illustrated in FIG. 11B, and the bridge electrode unit 70-1 illustrated in FIG. 11C.

For example, as illustrated in FIG. 11A to FIG. 11D, when an inter-electrode region formed by an interval between the first sensing electrode unit 40-1 and the second sensing electrode unit 50-1 has a large width, an inter-electrode dummy 203 which has the same shape as the unit transparent electrodes 103 and which is electrically insulated from the unit transparent electrodes 103 included in the first sensing electrode unit 40-1 and the second sensing electrode unit 50-1 may be additionally formed. As disclosed in FIG. 11A to FIG. 11D, the plurality of unit transparent electrodes 103 included in the first sensing electrode unit 40-1 and the second sensing electrode unit 50-1 are electrically connected to one another, whereas the inter-electrode dummy 203 present in the inter-electrode region is electrically insulated from the unit transparent electrodes 103. When the inter-electrode dummy 203 is utilized, a plurality of dummy patterns having the same spatial frequency as the fine etching patterns may be inserted into a space between the first sensing electrode unit 40-1 and the second sensing electrode unit 50-1 to dispose the same high-frequency component on the front surface of the touch sensor. Thus, it is possible to prevent a touch sensor pattern from being visible by means of the same high-frequency component disposed on the front surface of the touch sensor.

In FIG. 11C, the bridge electrode unit 70-1 is represented as a dumbbell shape in which both ends are circular and a middle portion is formed as a straight line. However, this is merely an example, and the bridge electrode unit 70-1 may be a straight line or a curved line.

As an example, the bridge electrode unit 70-1 may have a material containing metal. In this case, the bridge electrode unit 70-1 may have a length ranging from 100 μm to 500 μm and a width ranging from 2 μm to 10 μm.

As another example, the bridge electrode unit 70-1 may have a material containing ITO. In this case, the bridge electrode unit 70-1 may have a length ranging from 100 μm to 500 μm and a width ranging from 15 μm to 60 μm.

Metal has higher electrical conductivity but lower transparency than ITO. Thus, by allowing the bridge electrode unit 70-1 to have a shorter width when the bridge electrode unit 70-1 is made of metal than when the bridge electrode unit 70-1 is made of ITO, it is possible to improve the visibility of the touch sensor to which the bridge electrode unit 70-1 made of metal is applied.

A process of forming the plurality of unit transparent electrodes 103 illustrated in FIG. 11A to FIG. 11D is described with reference to FIG. 12A to FIG. 12D as follows.

Figure 12A:
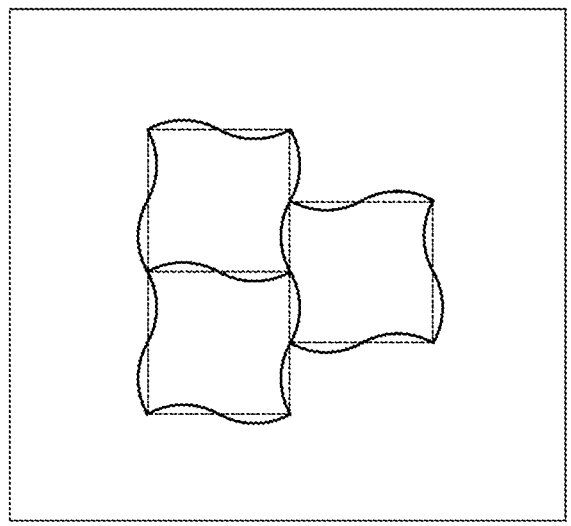
FIG. 12A to FIG. 12D are diagrams illustrating a process of forming the transparent fine pattern illustrated in FIG. 11A to FIG. 11D.
Figure 12B:
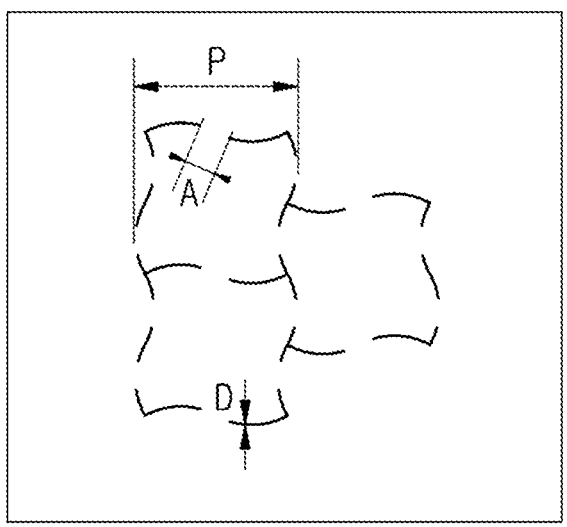

In FIG. 12A and FIG. 12B, for convenience of understanding, ITO is represented in white, and the etched portion is represented in black. In FIG. 11A, FIG. 11B, FIG. 11D, FIG. 12C, and FIG. 12D, a black region indicates ITO, and a white region indicates a portion to be etched out and removed.

Figure 12C:
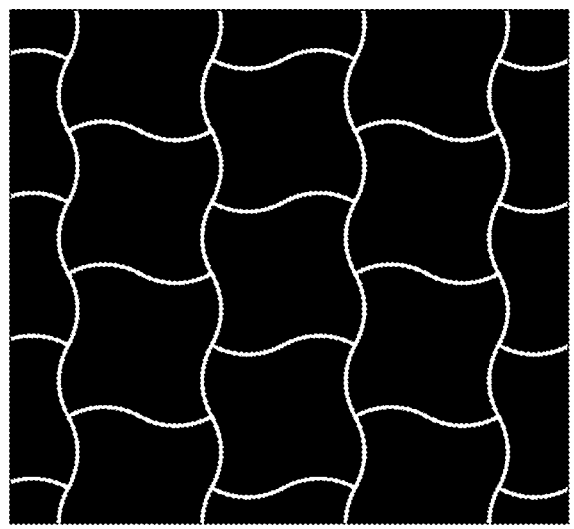

First, referring to FIG. 12A, in order to form one unit transparent electrode 103, it is assumed that a virtual quadrangle represented by a dotted line in the transparent electrode made of the material such as ITO is arranged in a zigzag structure, and two adjacent vertices of the virtual quadrangle are connected using a curved line such as a sinusoidal wave. This process is repeatedly performed on four vertices. As a result, four curved lines are connected to one another with respect to one virtual quadrangle. It will be appreciated that this process is performed on all of the unit transparent electrodes 103 as shown in FIG. 12C.

Figure 12D:
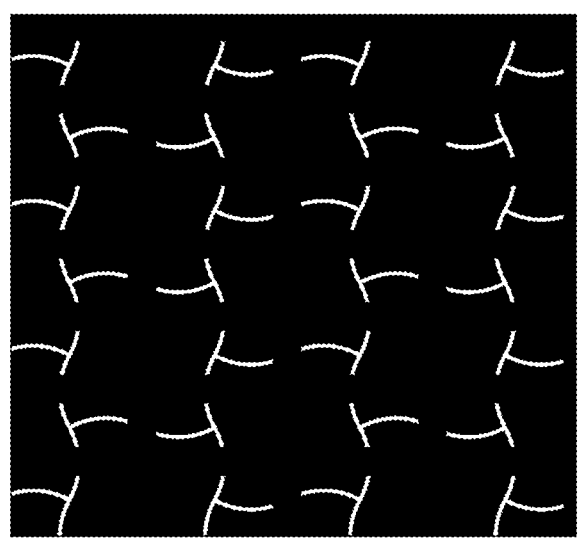

Next, referring to FIG. 12B, one unit transparent electrode 103 is formed by partially removing the curved lines connected to one another. In FIG. 12B, a white background region indicates ITO, and a black curved line is a portion to be removed through etching. This portion is a fine etching pattern. This process is performed on all of the unit transparent electrodes 103 as shown in FIG. 12D.

For example, the unit transparent electrodes 103 may have a pitch P ranging from 100 μm to 500 μm and an interval (i.e., the width D of the fine etching patterns) ranging from 5 μm to 20 μm. With such a configuration, when external light is applied to the touch sensor, a low-frequency component of a spatial frequency induced by the transparent electrode is converted into a high-frequency component that is not visible to a user, and also the total light transmittance of the touch sensor increases along with an increase in the light transmittance of the electrode region, which is a region where the transparent electrode is present, i.e., the first sensing electrode unit 40-1 and the second sensing electrode unit 50-1.

Also, for example, a connection unit configured to connect adjacent unit transparent electrodes 103 may have a width A ranging from 20 μm to 60 μm. With such a configuration, it is possible to prevent an increase in resistance that may occur during a process of connecting adjacent unit transparent electrodes 103 and also to prevent a reduction in visibility caused by the connection unit.

<Fourth Unit Transparent Electrode 104>

FIG. 13A to FIG. 13D are diagrams showing another exemplary planar shape of unit transparent electrodes 104 included in the first sensing electrode unit 40-1 and the second sensing electrode unit 50-1 according to embodiments of the present invention, and FIG. 14A to FIG. 14D are diagrams illustrating a process of forming the unit transparent electrodes 104 illustrated in FIG. 13A to FIG. 13D.

Additionally referring to FIG. 13A to FIG. 14D, boundary portions of the unit transparent electrodes 104 included in the first sensing electrode unit 40-1 and the second sensing electrode unit 50-1 have a shape in which a portion of a curved line connecting two adjacent vertices among the four vertices of a rhombus is etched out and removed, and the etched and removed portion is a fine etching pattern.

For example, the unit transparent electrodes 104 distinguished by such fine etching patterns may have a shape corresponding to the rhombus, and a plurality of unit transparent electrodes 104 included in the first sensing electrode unit 40-1 and the second sensing electrode unit 50-1 may have a tessellation structure in which the rhombus is regularly and repeatedly arranged. More preferably, the plurality of unit transparent electrodes 104 may have a regular tessellation structure.

Figure 13A:
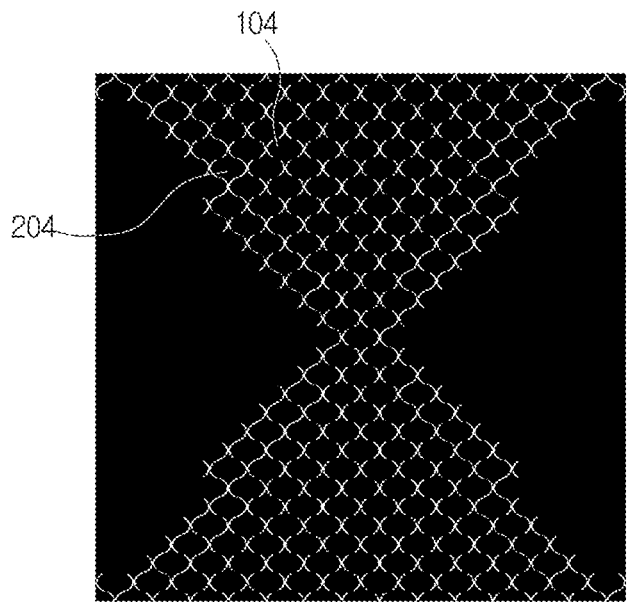
FIG. 13A to FIG. 13D are diagrams showing another exemplary planar shape of the transparent fine pattern included in the first sensing electrode unit and the second sensing electrode unit according to embodiments of the present invention.
Figure 13B:
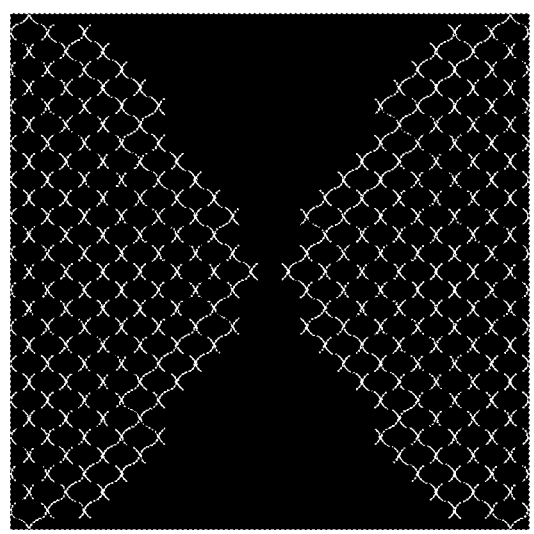
Figure 13C:
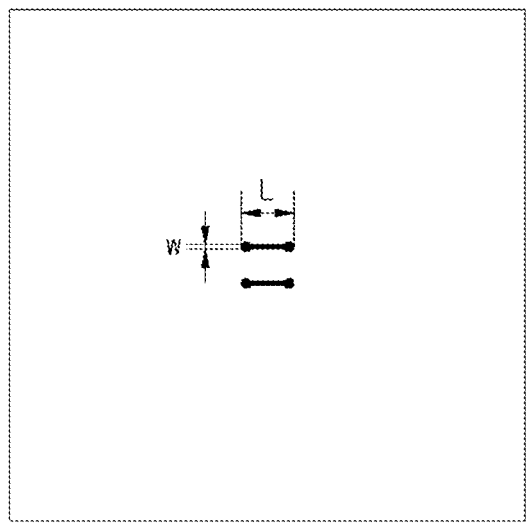
Figure 13D:
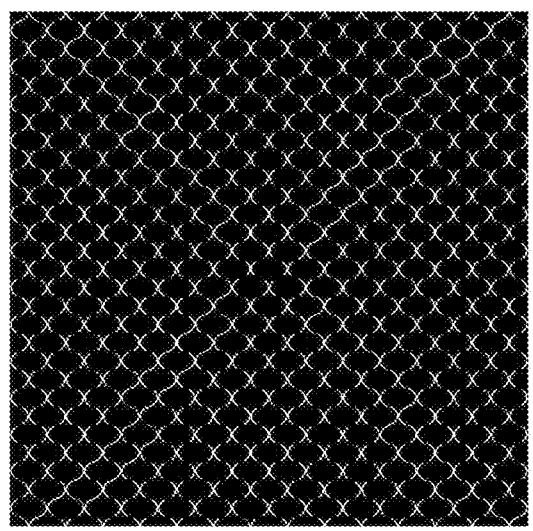

FIG. 13A shows a planar shape of the plurality of unit transparent electrodes 104 distinguished by the fine etching patterns included in the first sensing electrode unit 40-1. FIG. 13B shows a planar shape of the plurality of unit transparent electrodes 104 distinguished by the fine etching patterns included in the second sensing electrode unit 50-1. FIG. 13C shows a planar shape of the bridge electrode unit 70-1. FIG. 13D shows a planar shape of the touch sensor including the plurality of unit transparent electrodes 104 included in the first sensing electrode unit 40-1 illustrated in FIG. 13A, the plurality of unit transparent electrodes 104 included in the second sensing electrode unit 50-1 illustrated in FIG. 13B, and the bridge electrode unit 70-1 illustrated in FIG. 13C.

For example, as illustrated in FIG. 13A to FIG. 13D, when an inter-electrode region formed by an interval between the first sensing electrode unit 40-1 and the second sensing electrode unit 50-1 has a large width, an inter-electrode dummy 204 which has the same shape as the unit transparent electrodes 104 and which is electrically insulated from the unit transparent electrodes 104 included in the first sensing electrode unit 40-1 and the second sensing electrode unit 50-1 may be additionally formed. As disclosed in FIG. 13A to FIG. 13D, the plurality of unit transparent electrodes 104 included in the first sensing electrode unit 40-1 and the second sensing electrode unit 50-1 are electrically connected to one another, whereas the inter-electrode dummy 204 present in the inter-electrode region is electrically insulated from the unit transparent electrodes 104. When the inter-electrode dummy 204 is utilized, a plurality of dummy patterns having the same spatial frequency as the fine etching patterns may be inserted into a space between the first sensing electrode unit 40-1 and the second sensing electrode unit 50-1 to dispose the same high-frequency component on the front surface of the touch sensor. Thus, it is possible to prevent a touch sensor pattern from being visible by means of the same high-frequency component disposed on the front surface of the touch sensor.

In FIG. 13C, the bridge electrode unit 70-1 is represented as a dumbbell shape in which both ends are circular and a middle portion is formed as a straight line. However, this is merely an example, and the bridge electrode unit 70-1 may be a straight line or a curved line.

As an example, the bridge electrode unit 70-1 may have a material containing metal. In this case, the bridge electrode unit 70-1 may have a length ranging from 100 µm to 500 µm and a width ranging from 2 µm to 10 µm.

As another example, the bridge electrode unit 70-1 may have a material containing ITO. In this case, the bridge electrode unit 70-1 may have a length ranging from 100 µm to 500 µm and a width ranging from 15 µm to 60 µm.

Metal has higher electrical conductivity but lower transparency than ITO. Thus, by allowing the bridge electrode unit 70-1 to have a shorter width when the bridge electrode unit 70-1 is made of metal than when the bridge electrode unit 70-1 is made of ITO, it is possible to improve the visibility of the touch sensor to which the bridge electrode unit 70-1 made of metal is applied.

A process of forming the plurality of unit transparent electrodes 104 illustrated in FIG. 13A to FIG. 13D is described with reference to FIG. 14A to FIG. 14D as follows.

Figure 14A:
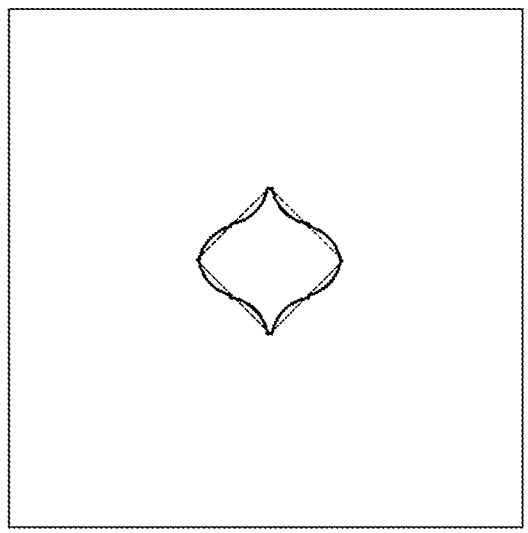
FIG. 14A to FIG. 14D are diagrams illustrating a process of forming the transparent fine pattern illustrated in FIG. 13A to FIG. 13D.
Figure 14B:
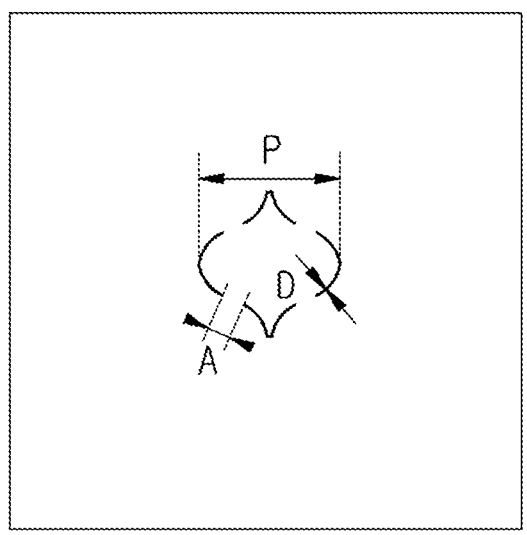

In FIG. 14A and FIG. 14B, for convenience of understanding, ITO is represented in white, and the etched portion is represented in black. In FIG. 13A, FIG. 13B, FIG. 13D, FIG. 14C, and FIG. 14D, a black region indicates ITO, and a white region indicates a portion to be etched out and removed.

Figure 14C:
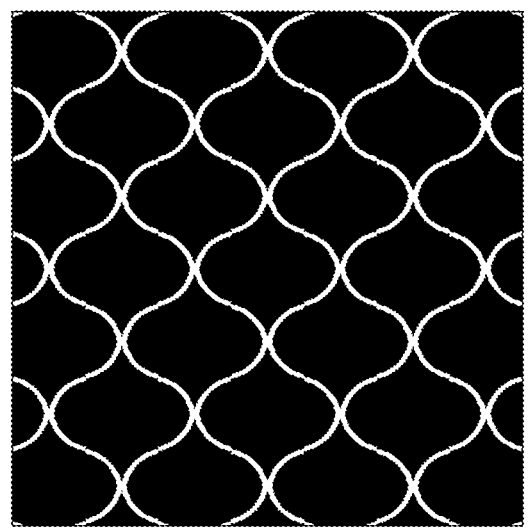
Figure 14D:
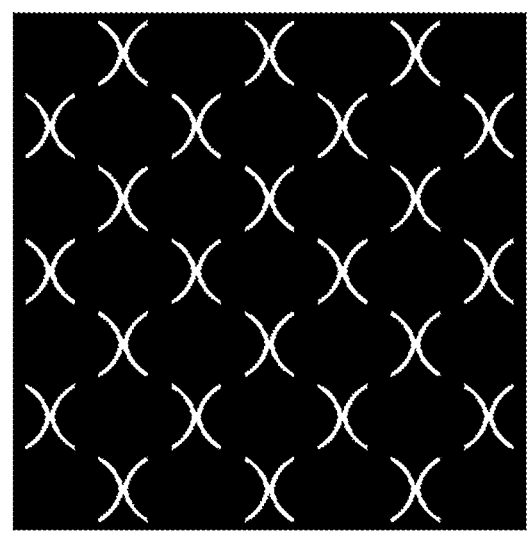

First, referring to FIG. 14A, in order to form one unit transparent electrode 104, a virtual rhombus represented by a dotted line in the transparent electrode made of the material such as ITO is assumed, and two adjacent vertices of the virtual rhombus are connected using a curved line such as a sinusoidal wave. This process is repeatedly performed on four vertices. As a result, four curved lines are connected to one another with respect to one virtual rhombus. It will be appreciated that this process is performed on all of the unit transparent electrodes 104 as shown in FIG. 14C.

Next, referring to FIG. 14B, one unit transparent electrode 104 is formed by partially removing the curved lines connected to one another. In FIG. 14B, a white background region indicates ITO, and a black curved line is a portion to be removed through etching. This portion is a fine etching pattern. This process is performed on all of the unit transparent electrodes 104 as shown in FIG. 10D.

For example, the unit transparent electrodes 104 may have a pitch P ranging from 100 µm to 500 µm and an interval (i.e., the width D of the fine etching patterns) ranging from 5 µm to 20 µm. With such a configuration, when external light is applied to the touch sensor, a low-frequency component of a spatial frequency induced by the transparent electrode is converted into a high-frequency component that is not visible to a user, and also the total light transmittance of the touch sensor increases along with an increase in the light transmittance of the electrode region, which is a region where the transparent electrode is present, i.e., the first sensing electrode unit 40-1 and the second sensing electrode unit 50-1.

Also, for example, a connection unit configured to connect adjacent unit transparent electrodes 104 may have a width A ranging from 20 µm to 60 µm. With such a configuration, it is possible to prevent an increase in resistance that may occur during a process of connecting adjacent unit transparent electrodes 104 and also to prevent a reduction in visibility caused by the connection unit.

Although not shown in a drawing, boundary portions of the unit transparent electrodes included in the first sensing electrode unit 40-1 and the second sensing electrode unit 50-1 may have a shape in which a portion of a curved line connecting two adjacent vertices among the three vertices of a triangle is removed.

Experiments on the improvement of visibility due to the first and second sensing electrode units, each of which is an aggregation of the unit transparent electrodes distinguished by the plurality of fine etching patterns, i.e., experiments on a property in which a transparent electrode is not unnecessarily visible to a user, actually depend on the user's visual acuity. The inventors questioned whether or not a transparent electrode was visible to 100 experimental groups, and as a result, all of the experimental groups answered that the transparent electrode was not seen.

The following Table 1 shows a result obtained by comparing the optical characteristics of the related art and the unit transparent electrodes 101, 102, 103, and 104 having the four patterns of the first embodiment of the present invention.

ylene naphthalate, and polybutylene terephthalate; cellulose-based resins such as diacetylcellulose and triacetylcellulose; polycarbonate-based resins; acrylic resins such as polymethyl (meth) acrylate and polyethyl (meth) acrylate; styrene-based resins such as polystyrene and acrylonitrile-styrene copolymers; polyolefin-based resins such as polyethylene, polypropylene, cyclo- or norbornene-structured polyolefins, and ethylene-propylene copolymers; vinyl chloride-based resins; amide-based resins such as nylon and aromatic polyamides; imide-based resins; polyether sulfone-based resins; sulfone-based resins; polyether ether ketone-based resins; sulfided polyphenylene-based resins; vinyl alcohol-based resins; vinylidene chloride-based resins; vinyl butyral-based resins; allylate-based resins; polyoxymethylene-based resins; and epoxy-based resins. Also, a film made of a blend consisting of the thermoplastic resins may be used. Also, a film made of a thermosetting resin such as (meth) acrylic resins, urethane-based resins, acrylic urethane-based resins, epoxy-based resins, and silicon-based resins or a film made of an ultraviolet-curable resin may be used. The transparent optical film may have a thickness that is appropriately determined. However, typically, the thickness may be determined to be in the range of 1 μm to 500

TABLE 1

|  | Related Art | First Unit Transparent Electrode (101) | Second Unit Transparent Electrode (102) | Third Unit Transparent Electrode (103) | Fourth Unit Transparent Electrode (104) |
| --- | --- | --- | --- | --- | --- |
| Transmittance (%) | 78.9 | 79.9 | 79.8 | 80 | 80.7 |
| Reflectance (%) | 20.5 | 19.4 | 19.5 | 19.6 | 18.9 |
| Visibility (Maximum: 10) | 10 | 0 | 0 | 0 | 0 |

Referring to Table 1, both of the transmittance and the reflectance were improved when the unit transparent electrodes 101, 102, 103, and 104 to which four fine etching patterns were applied were applied to the first and second sensing electrode units according to the first embodiment of the present invention as compared to when the related art in which the transparent fine pattern was not applied. Also, in the visibility experiment for the experimental groups, that is, in a question about whether the transparent electrode was visible, all of the experimental groups answered that the transparent electrode was not visible.

The elements will be described in detail below.

The substrate 10 is a base that structurally supports the elements constituting the touch sensor.

As one example, the substrate 10 may be configured to have a rigid material with excellent properties such as heat resistance and chemical resistance, for example glass, stainless steel (SUS), and the like.

As another example, the substrate 10 may be configured to have a flexible material. With such a configuration, the touch sensor may be stably applied to a bendable, foldable, rollable, or stretchable display that requires flexible properties.

For example, the substrate 10 having a flexible material may be a transparent optical film or a polarizing plate.

As the transparent optical film, a film with high transparency, mechanical strength, and thermal stability may be used. Specific examples may include films made of thermoplastic resins, including polyester-based resins such as polyethylene terephthalate, polyethylene isophthalate, polyeth- μm in consideration of thin layer properties, workability such as strength and handleability, and the like. In particular, it is preferable that the thickness ranges from 1 μm to 300 μm. More preferably, the thickness may range from 5 μm to 200 μm.

The transparent optical film may contain one or more suitable types of additives. Examples of the additives include, for example, ultraviolet absorbers, antioxidants, lubricants, plasticizers, release agents, anti-coloring agents, anti-flame agents, nucleating agents, antistatic agents, pigments, and colorants. The transparent optical film may have a structure including various functional layers such as a rigid coating layer, an anti-reflective layer, and a gas barrier layer on one or both surfaces thereof. The functional layers are not limited to the above description, and a variety of other functional layers may be included depending on the desired use.

Also, if necessary, the transparent optical film may be surface-treated. Examples of the surface treatment may include drying treatment such as plasma treatment, corona treatment, and primer treatment, chemical treatment such as alkali treatment including saponification, etc.

Also, the transparent optical film may be an isotropic film, a retardation film, or a protective film.

In the case of the isotropic film, an in-plane retardation Ro ($Ro=[(nx-ny)\times d]$, where nx and ny are each a main refractive index in a film plan) is less than or equal to 40 nm and preferably less than or equal to 15 nm, and a thickness-direction retardation Rth ($Rth=[(nx+ny)/2-nz]\times d$, where nx and ny are each a main refractive index in a film plane, nz is a refractive index in a film thickness direction, and d is a film thickness) ranges from −90 nm to +75 nm, preferably from −80 nm to +60 nm, and more preferably from −70 nm to +45 nm.

The retardation film is a film that is manufactured by uni-axial stretching, bi-axial stretching, polymer coating, and liquid crystal coating for a polymer film. Generally, the retardation film is used to enhance and adjust optical properties of a display, such as viewing angle compensation, color impression improvement, light leakage improvement, and color adjustment. The retardation film may include a half-wavelength (½) or quarter-wavelength (¼) plate, a positive C-plate, a negative C-plate, a positive A-plate, a negative A-plate, and a biaxial wavelength plate.

The protective film may be a polymer resin film including an adhesive layer on at least one surface or a self-adhesive film such as polypropylene. The protective film may be used for protection of a touch sensor surface and for improvement of processability.

A well-known polarizing plate used for a display panel may be used as the polarizing plate. Specifically, the polarizing plate may be formed by stretching a polyvinyl alcohol film and installing a protective layer on at least one surface of a polarizer dyed with iodine or a dichroic dye, by orienting a liquid crystal to have polarizer performance, or by coating a transparent film with an oriented resin such as polyvinyl alcohol and then stretching and dying the coated transparent film. However, the present invention is not limited thereto.

A separation layer 20 is an element that may be applied when the substrate 10 is made of a flexible material. The separation layer 20 is a layer that is formed to detach the elements of the touch sensor from a rigid carrier substrate on which the elements are formed during a manufacturing process for the touch sensor. The elements detached from the carrier substrate may be bonded to a film type substrate 10 made of a flexible material by a roll-to-roll method.

The material of the separation layer 20 is not particularly limited as long as the material satisfies a condition for providing a certain level of detachment force and transparency. For example, the separation layer 20 may be made of a polymer such as polyimide-based polymers, poly vinyl alcohol-based polymers, polyamic acid-based polymers, polyamide-based polymers, polyethylene-based polymers, polystyrene-based polymers, polynorbornene-based polymers, phenylmaleimide copolymer-based polymers, polyazobenzene-based polymers, polyphenylenephthalamide-based polymers, polyester-based polymers, polymethyl methacrylate-based polymers, polyarylate-based polymers, cinnamate-based polymers, coumarin-based polymers, phthalimidine-based polymers, chalcone-based polymers, and aromatic acetylene-based polymers. The polymers may be used alone or in combination thereof.

The detachment force of the separation layer 20 is not particularly limited. For example, the detachment force may be in the range of 0.01N/25 mm to 1N/25 mm and preferably in the range of 0.01N/25 mm to 0.1N/25 mm. When the range is satisfied, the elements of the touch sensor may be easily detached from the carrier substrate without residue during the manufacturing process for the touch sensor, and also it is possible to reduce a curl and cracks caused by a tension force generated during the detachment.

The thickness of the separation layer 20 is not particularly limited. For example, the thickness may range from 10 nm to 1,000 nm and preferably from 50 nm to 500 nm. When the range is satisfied, the detachment force may be stable, and a uniform pattern may be formed.

An inner protective layer 30 is formed on the separation layer 20 and is an optional element that may be omitted if necessary. The inner protective layer 30 functions to prevent the separation layer 20 from being exposed to an etchant for forming the first sensing electrode unit 40-1, the second sensing electrode unit 50-1, and the bridge electrode unit 70-1 during the manufacturing process for the touch sensor according to embodiments of the present invention.

As the material of the inner protective layer 30, polymers known in the art may be used with limitation. For example, organic insulating films may be applied. Among the organic insulating films, the inner protective layer 30 may be formed of a curable composition including a polyol and a melamine curing agent, but the present invention is not limited thereto.

Specific examples of the polyol may include, but are not limited to, polyether glycol derivatives, polyester glycol derivatives, and polycaprolactone glycol derivatives.

Specific examples of the melamine curing agent may include, but are not limited to, methoxy methyl melamine derivatives, methyl melamine derivatives, butyl melamine derivatives, isobutoxy melamine derivatives, and butoxy melamine derivatives, and the like.

As another example, the inner protective layer 30 may be formed of a hybrid organic-inorganic curable composition. When both of an organic compound and an inorganic compound are used, it is possible to reduce a crack generated during a detachment.

The above-described components may be used as the organic compound. Examples of the inorganic compound include, but are not limited to, silica-based nanoparticles, silicon-based nanoparticles, glass nanofibers, and the like.

A plurality of first sensing electrode units 40-1 are formed on a substrate 10 and connected to one another in a first direction. A plurality of second sensing electrode units 50-1 are formed on the substrate 10 and separated from one another in a second direction crossing the first direction. An insulating layer 60 is formed on the substrate 10 on which the first sensing electrode units 40-1 and the second sensing electrode units 50-1 are formed such that at least some of the second sensing electrode units 50-1 are exposed through a through-hole. A bridge electrode unit 70-1 is formed on the insulating layer 60 to occupy the through-hole and thus connects two adjacent second sensing electrode units 50-1 to each other with a first sensing electrode unit 40-1 interposed therebetween.

As described above, a plurality of fine etching patterns are formed in boundary portions of unit transparent electrodes included in the first sensing electrode units 40-1 and the second sensing electrode units 50-1. Each unit transparent electrode has a shape in which a portion of a curved line connecting the vertices of a polygon is removed, and adjacent unit transparent electrodes are electrically connected to each other.

The first sensing electrodes units 40-1 are formed in the first direction while being electrically connected to one another, and the second sensing electrode units 50-1 are formed in the second direction while being electrically separated from one another. The second direction crosses the first direction. For example, the crossing directions refer to directions of two different straight lines that are coplanar but not parallel to each other. For example, the first direction may be an x-axis direction, and the second direction may be a y-axis direction. Such a first sensing electrode unit 40-1 and such a second sensing electrode unit 50-1 may be electrically insulated from each other by the insulating layer 60 which will be described below.

For example, in order to reduce surface resistance, at least one of the first sensing electrode unit 40-1 and the second sensing electrode unit 50-1 may have a multi-layer structure, and more specifically, a triple-layer structure composed of metal oxide, metal, and metal oxide.

The bridge electrode unit 70-1 electrically connects adjacent second sensing electrode units 50-1 to each other.

As the first sensing electrode unit 40-1, the second sensing electrode unit 50-1, and the bridge electrode unit 70-1, any transparent conductive material may be used without limitation. For example, the first sensing electrode unit 40-1, the second sensing electrode unit 50-1, and the bridge electrode unit 70-1 may be formed of a material selected from among a metal oxide selected from the group consisting of indium tin oxide (ITO), indium zinc oxide (IZO), indium zinc tin oxide (IZTO), aluminum zinc oxide (AZO), gallium zinc oxide (GZO), florinthine oxide (FTO), indium tin oxide-silver-indium tin oxide (ITO-Ag-ITO), indium zinc oxide-silver-indium zinc oxide (IZO—Ag—IZO), indium zinc tin oxide-silver-indium zinc tin oxide (IZTO-Ag-IZTO), and aluminum zinc oxide-silver-aluminum zinc oxide (AZO-Ag-AZO); a metal selected from the group of gold (Au), silver (Ag), copper (Cu), molybdenum (Mo), and APC; a nanowire of a metal selected from the group consisting of gold, silver, copper, and lead; a carbon-based material selected from the group consisting of carbon nanotubes (CNT) and graphene; and a conductive polymer material selected from the group consisting of poly(3,4-ethylenedioxythiophene) (PEDOT) and polyaniline (PANI). These materials may be used alone or in combination thereof. Preferably, ITO may be used. Crystalline and amorphous ITOs are all available.

The thicknesses of the first sensing electrode unit 40-1, the second sensing electrode unit 50-1, and the bridge electrode unit 70-1 are not particularly limited, but it is preferable that they are as thin as possible in consideration of the flexibility of the touch sensor.

Each of the first sensing electrode unit 40-1 and the second sensing electrode unit 50-1 may be an aggregate of a plurality of unit transparent electrodes.

For example, the first sensing electrode unit 40-1 and the second sensing electrode unit 50-1 may independently have polygonal (triangular, tetragonal, pentagonal, hexagonal, heptagonal, or more) patterns.

Also, for example, one of the first sensing electrode unit 40-1, the second sensing electrode unit 50-1, and the bridge electrode unit 70-1 may be configured in a stripe form.

As the material of the insulating layer 60 for insulating the first sensing electrode unit 40-1 and the second sensing electrode unit 50-1, an insulating material known in the art may be used without limitation. For example, a thermosetting resin composition or a photosensitive resin composition including acrylic resins or metal oxides such as a silicon oxide may be used. Alternatively, the insulating layer 60 may be formed using an inorganic material such as a silicon oxide SiOx. In this case, deposition, sputtering, or the like may be used for the formation.

A device protection layer 80 is formed on the insulating layer 60 on which the bridge electrode unit 70-1 is formed and is configured to insulate and protect the elements of the touch sensor from the outside.

As the material of the device protection layer 80, an insulating material known in the art may be used without limitation. For example, a thermosetting resin composition or a photosensitive resin composition including acrylic resins or metal oxides such as a silicon oxide may be used. Alternatively, the device protection layer 80 may be formed using an inorganic material such as a silicon oxide SiOx. In this case, deposition, sputtering, or the like may be used for the formation.

FIG. 5 is a sectional view of a touch sensor according to a second embodiment of the present invention.

As described above, while the touch sensor according to the first embodiment of the present invention has an upper bridge structure in which the bridge electrode unit 70-1 is located over the first sensing electrode unit 40-1 and the second sensing electrode unit 50-1, the touch sensor according to the second embodiment of the present invention has a lower bridge structure in which a bridge electrode unit 70-2 is located under a first sensing electrode unit 40-2 and a second sensing electrode unit 50-2.

Except for this difference, the second embodiment of the present invention is substantially the same as the first embodiment, and thus a redundant description thereof will be omitted.

FIG. 6 is a sectional view of a touch sensor according to a third embodiment of the present invention.

As described above, unlike the first and second embodiments, the third embodiment has a counter electrode structure in which no bridge electrode is used. The counter electrode structure has a structure in which a first sensing electrode unit 40-3 and a second sensing electrode unit 50-3 face each other with an insulating layer 60 interposed therebetween.

Except for this difference, the third embodiment of the present invention is substantially the same as the first and second embodiments, and thus a redundant description thereof will be omitted.

As described above in detail, according to the present invention, by forming unit transparent electrodes distinguished by a plurality of fine etching patterns on a transparent electrode in order to improve visibility and light transmittance of the transparent electrode, it is possible to prevent the transparent electrode from being unnecessarily visible to a user due to a difference in optical characteristics between an electrode region where the transparent electrode is formed and an inter-electrode region where no transparent electrode is formed and also to prevent a reduction in light transmittance due to the transparent electrode.

Also, by converting a low-frequency component of a spatial frequency induced by transparent electrodes that are repeatedly formed inside a touch sensor at regular spatial intervals into a high-frequency component that is not visible to a user by means of unit transparent electrodes distinguished by a plurality of fine etching patterns formed in each of the transparent electrodes, it is possible to increase the light transmittance of the touch sensor and also to enhance the visibility of the touch sensor.

Also, when a touch sensor is bonded to a display panel, it is possible to prevent an optical interference pattern due to interference between a pixel array of the touch sensor and a pixel array of the display panel from being exhibited as a moiré pattern to prevent a reduction in optical quality.

DESCRIPTION OF SYMBOLS

10: substrate
20: separation layer
30: inner protective layer
40-1, 40-2, 40-3: first sensing electrode unit
50-1, 50-2, 50-3: second sensing electrode unit
60: insulating layer
70-1, 70-2: bridge electrode unit
80: device protection layer 101, 102, 103, 104: unit transparent electrode
201, 202, 203, 204: inter-electrode dummy

The invention claimed is:

1. A touch sensor comprising:
a first sensing electrode unit formed on a substrate in a first direction; and
a second sensing electrode unit formed on the substrate in a second direction crossing the first direction,
wherein,
a plurality of fine etching patterns are formed in boundary portions of unit transparent electrodes included in the first sensing electrode unit and the second sensing electrode unit,
each unit transparent electrode has a shape in which a portion of a curved line connecting vertices of a polygon is removed, and adjacent unit transparent electrodes are electrically connected to each other,
an inter-electrode dummy is formed between the first sensing electrode unit and the second sensing electrode unit, the inter-electrode dummy has the same shape as the unit transparent electrodes, and the inter-electrode dummy is electrically insulated from the unit transparent electrodes, and
a plurality of the unit transparent electrodes distinguished by the fine etching patterns have a tessellation structure.

2. The touch sensor of claim 1, wherein the curved line is a curved line that continuously connects the vertices of the polygon or a curved line that is partially formed by discontinuously connecting the vertices of the polygon.

3. The touch sensor of claim 1, wherein the boundary portions of the unit transparent electrodes have a shape in which a portion of a curved line connecting two adjacent vertices among six vertices of a hexagon is removed.

4. The touch sensor of claim 1, wherein the boundary portions of the unit transparent electrodes have a shape in which a portion of a curved line connecting two adjacent vertices among four vertices of a quadrangle arranged in a lattice structure is removed.

5. The touch sensor of claim 1, wherein the boundary portions of the unit transparent electrodes have a shape in which a portion of a curved line connecting two adjacent vertices among four vertices of a quadrangle arranged in a zigzag structure is removed.

6. The touch sensor of claim 1, wherein the boundary portions of the unit transparent electrodes have a shape in which a portion of a curved line connecting two adjacent vertices among four vertices of a rhombus is removed.

7. The touch sensor of claim 1, wherein the boundary portions of the unit transparent electrodes have a shape in which a portion of a curved line connecting two adjacent vertices among three vertices of a triangle is removed.

8. A touch sensor comprising:
first sensing electrode units formed in a first direction and connected to one another;
second sensing electrode units formed in a second direction crossing the first direction and separated from one another; and
a bridge electrode unit configured to connect two adjacent second sensing electrodes to each other with one first sensing electrode unit interposed therebetween,
wherein,
a plurality of fine etching patterns are formed in boundary portions of unit transparent electrodes included in the first sensing electrode unit and the second sensing electrode unit,
each unit transparent electrode has a shape in which a portion of a curved line connecting vertices of a polygon is removed, and adjacent unit transparent electrodes are electrically connected to each other,
an inter-electrode dummy is formed between the first sensing electrode unit and the second sensing electrode unit, the inter-electrode dummy has the same shape as the unit transparent electrodes, and the inter-electrode dummy is electrically insulated from the unit transparent electrodes, and
a plurality of the unit transparent electrodes distinguished by the fine etching patterns have a tessellation structure.

9. The touch sensor of claim 8, wherein the curved line is a curved line that continuously connects the vertices of the polygon or a curved line that is partially formed by discontinuously connecting the vertices of the polygon.

10. The touch sensor of claim 8, wherein the boundary portions of the unit transparent electrodes have a shape in which a portion of a curved line connecting two adjacent vertices among six vertices of a hexagon is removed.

11. The touch sensor of claim 8, wherein the boundary portions of the unit transparent electrodes have a shape in which a portion of a curved line connecting two adjacent vertices among four vertices of a quadrangle arranged in a lattice structure is removed.

12. The touch sensor of claim 8, wherein the boundary portions of the unit transparent electrodes have a shape in which a portion of a curved line connecting two adjacent vertices among four vertices of a quadrangle arranged in a zigzag structure is removed.

13. The touch sensor of claim 8, wherein the boundary portions of the unit transparent electrodes have a shape in which a portion of a curved line connecting two adjacent vertices among four vertices of a rhombus is removed.

14. The touch sensor of claim 8, wherein the boundary portions of the unit transparent electrodes have a shape in which a portion of a curved line connecting two adjacent vertices among three vertices of a triangle is removed.

* * * * *